United States Patent
Padmanabhan et al.

(10) Patent No.: US 10,089,127 B2
(45) Date of Patent: Oct. 2, 2018

(54) CONTROL PLANE INTERFACE FOR LOGICAL MIDDLEBOX SERVICES

(71) Applicant: Nicira, Inc., Palo Alto, CA (US)

(72) Inventors: Amar Padmanabhan, Menlo Park, CA (US); Teemu Koponen, San Francisco, CA (US); Ronghua Zhang, San Jose, CA (US); Pankaj Thakkar, Santa Clara, CA (US); Bruce Davie, Menlo Park, CA (US); Martin Casado, Portola Valley, CA (US)

(73) Assignee: NICIRA, INC., Palo Alto, CA (US)

( * ) Notice: Subject to any disclaimer, the term of this patent is extended or adjusted under 35 U.S.C. 154(b) by 428 days.

(21) Appl. No.: 13/678,536

(22) Filed: Nov. 15, 2012

(65) Prior Publication Data

US 2013/0132533 A1     May 23, 2013

Related U.S. Application Data

(60) Provisional application No. 61/560,279, filed on Nov. 15, 2011.

(51) Int. Cl.
*G06F 15/177* (2006.01)
*G06F 9/455* (2018.01)
(Continued)

(52) U.S. Cl.
CPC .......... *G06F 9/45558* (2013.01); *H04L 41/08* (2013.01); *H04L 41/0803* (2013.01);
(Continued)

(58) Field of Classification Search
CPC ............. G06F 2009/4557; G06F 9/455; H04L 12/2424; H04L 41/0806; H04L 63/0218
(Continued)

(56) References Cited

U.S. PATENT DOCUMENTS 5,504,921 A    4/1996  Dev et al.
5,550,816 A    8/1996  Hardwick et al.
(Continued)

FOREIGN PATENT DOCUMENTS

AU    2012340383    4/2014
AU    2012340387    4/2014
(Continued)

OTHER PUBLICATIONS

Joseph et al., "A Policy-aware Switching Layer for Data Centers", Aug. 2008, pp. 51-62 [Retrieved from the Internet on Dec. 14, 2017.*

(Continued)

*Primary Examiner* — Oscar A Louie
*Assistant Examiner* — Adam A Cooney
(74) *Attorney, Agent, or Firm* — Adeli LLP

(57) ABSTRACT

Some embodiments provide a non-transitory machine readable medium of a first middlebox element of several middlebox elements to implement a middlebox instance in a distributed manner in several hosts. The non-transitory machine readable medium stores a set of instructions for receiving (1) configuration data for configuring the middlebox instance to implement a middlebox in a logical network and (2) a particular identifier associated with the middlebox in the logical network. The non-transitory machine readable medium stores a set of instructions for generating (1) a set of rules to process packets for the middlebox in the logical network and (2) an internal identifier associated with the set of rules. The non-transitory machine readable medium stores a set of instructions for associating the particular identifier with the internal identifier for later processing of packets having the particular identifier.

22 Claims, 10 Drawing Sheets

(51) Int. Cl.
| | |
|---|---|
| *H04L 12/24* | (2006.01) |
| *H04L 29/06* | (2006.01) |
| *H04L 12/931* | (2013.01) |
| *H04L 29/08* | (2006.01) |
| *H04L 29/12* | (2006.01) |
| *H04L 12/715* | (2013.01) |
| *H04L 12/751* | (2013.01) |
| *H04L 12/933* | (2013.01) |

(52) U.S. Cl.
CPC ...... *H04L 41/0806* (2013.01); *H04L 41/0813* (2013.01); *H04L 41/0823* (2013.01); *H04L 41/0889* (2013.01); *H04L 41/0893* (2013.01); *H04L 45/64* (2013.01); *H04L 49/70* (2013.01); *H04L 61/256* (2013.01); *H04L 61/2517* (2013.01); *H04L 61/2521* (2013.01); *H04L 63/0218* (2013.01); *H04L 67/1008* (2013.01); *G06F 2009/4557* (2013.01); *G06F 2009/45595* (2013.01); *H04L 41/12* (2013.01); *H04L 45/02* (2013.01); *H04L 49/15* (2013.01)

(58) Field of Classification Search
USPC .......................................................... 709/220
See application file for complete search history.

(56) References Cited

U.S. PATENT DOCUMENTS

| | | | |
|---|---|---|---|
| 5,729,685 | A | 3/1998 | Chatwani et al. |
| 5,751,967 | A | 5/1998 | Raab et al. |
| 5,796,936 | A | 8/1998 | Watabe et al. |
| 6,104,699 | A | 8/2000 | Holender et al. |
| 6,219,699 | B1 | 4/2001 | McCloghrie et al. |
| 6,353,614 | B1 | 3/2002 | Borella et al. |
| 6,512,745 | B1 | 1/2003 | Abe et al. |
| 6,539,432 | B1 | 3/2003 | Taguchi et al. |
| 6,680,934 | B1 | 1/2004 | Cain |
| 6,785,843 | B1 | 8/2004 | McRae et al. |
| 6,880,089 | B1 | 4/2005 | Bommareddy et al. |
| 6,907,042 | B1 | 6/2005 | Oguchi |
| 6,963,585 | B1 | 11/2005 | Le Pennec et al. |
| 7,046,630 | B2 | 5/2006 | Abe et al. |
| 7,055,173 | B1 | 5/2006 | Chaganty et al. |
| 7,126,923 | B1 | 10/2006 | Yang et al. |
| 7,197,572 | B2 | 3/2007 | Matters et al. |
| 7,209,439 | B2 | 4/2007 | Rawlins et al. |
| 7,283,473 | B2 | 10/2007 | Arndt et al. |
| 7,286,490 | B2 | 10/2007 | Saleh et al. |
| 7,342,916 | B2 | 3/2008 | Das et al. |
| 7,343,410 | B2 | 3/2008 | Mercier et al. |
| 7,450,598 | B2 | 11/2008 | Chen et al. |
| 7,478,173 | B1 | 1/2009 | Delco |
| 7,512,744 | B2 | 3/2009 | Banga et al. |
| 7,555,002 | B2 | 6/2009 | Arndt et al. |
| 7,606,260 | B2 | 10/2009 | Oguchi et al. |
| 7,627,692 | B2 | 12/2009 | Pessi |
| 7,649,851 | B2 | 1/2010 | Takashige et al. |
| 7,706,266 | B2 | 4/2010 | Plamondon |
| 7,706,325 | B2 | 4/2010 | Fodor et al. |
| 7,710,874 | B2 | 5/2010 | Balakrishnan et al. |
| 7,730,486 | B2 | 6/2010 | Herington |
| 7,742,398 | B1 | 6/2010 | Tene et al. |
| 7,764,599 | B2 | 7/2010 | Doi et al. |
| 7,792,987 | B1 | 9/2010 | Vohra et al. |
| 7,802,000 | B1 | 9/2010 | Huang et al. |
| 7,808,929 | B2 | 10/2010 | Wong et al. |
| 7,818,452 | B2 | 10/2010 | Matthews et al. |
| 7,826,482 | B1 | 11/2010 | Minei et al. |
| 7,839,847 | B2 | 11/2010 | Nadeau et al. |
| 7,856,549 | B2 | 12/2010 | Wheeler |
| 7,885,276 | B1 | 2/2011 | Lin |
| 7,925,850 | B1 | 4/2011 | Waldspurger et al. |
| 7,936,770 | B1 | 5/2011 | Frattura et al. |
| 7,937,438 | B1* | 5/2011 | Miller .................. H04L 45/02 370/397 |
| 7,948,986 | B1 | 5/2011 | Ghosh et al. |
| 7,953,865 | B1 | 5/2011 | Miller et al. |
| 7,991,859 | B1 | 8/2011 | Miller et al. |
| 7,995,483 | B1 | 8/2011 | Bayar et al. |
| 8,005,015 | B2 | 8/2011 | Belqasmi et al. |
| 8,018,866 | B1 | 9/2011 | Kasturi et al. |
| 8,027,354 | B1 | 9/2011 | Portolani et al. |
| 8,031,633 | B2 | 10/2011 | Bueno et al. |
| 8,046,456 | B1 | 10/2011 | Miller et al. |
| 8,054,832 | B1 | 11/2011 | Shukla et al. |
| 8,055,789 | B2 | 11/2011 | Richardson et al. |
| 8,060,875 | B1 | 11/2011 | Lambeth |
| 8,064,362 | B2 | 11/2011 | Mekkattuparamban et al. |
| 8,131,852 | B1 | 3/2012 | Miller et al. |
| 8,149,737 | B2 | 4/2012 | Metke et al. |
| 8,155,028 | B2 | 4/2012 | Abu-Hamdeh et al. |
| 8,166,201 | B2 | 4/2012 | Richardson et al. |
| 8,190,767 | B1 | 5/2012 | Maufer et al. |
| 8,194,674 | B1 | 6/2012 | Pagel et al. |
| 8,199,750 | B1 | 6/2012 | Schultz et al. |
| 8,204,982 | B2 | 6/2012 | Casado et al. |
| 8,224,931 | B1 | 7/2012 | Brandwine et al. |
| 8,224,971 | B1 | 7/2012 | Miller et al. |
| 8,265,075 | B2 | 9/2012 | Pandey |
| 8,312,129 | B1 | 11/2012 | Miller et al. |
| 8,339,959 | B1 | 12/2012 | Moisand et al. |
| 8,339,994 | B2 | 12/2012 | Gnanasekaran et al. |
| 8,456,984 | B2 | 6/2013 | Ranganathan et al. |
| 8,463,904 | B2 | 6/2013 | Casado et al. |
| 8,468,548 | B2 | 6/2013 | Kulkarni et al. |
| 8,473,557 | B2 | 6/2013 | Ramakrishnan |
| 8,516,158 | B1 | 8/2013 | Wu et al. |
| 8,543,808 | B2 | 9/2013 | Ahmed et al. |
| 8,571,031 | B2 | 10/2013 | Davies et al. |
| 8,611,351 | B2 | 12/2013 | Gooch et al. |
| 8,612,627 | B1 | 12/2013 | Brandwine et al. |
| 8,615,579 | B1 | 12/2013 | Vincent et al. |
| 8,621,058 | B2 | 12/2013 | Eswaran et al. |
| 8,625,594 | B2 | 1/2014 | Safrai et al. |
| 8,644,188 | B1 | 2/2014 | Brandwine et al. |
| 8,650,299 | B1 | 2/2014 | Huang et al. |
| 8,650,618 | B2 | 2/2014 | Asati et al. |
| 8,705,527 | B1 | 4/2014 | Addepalli et al. |
| 8,743,885 | B2 | 6/2014 | Khan et al. |
| 8,762,501 | B2 | 6/2014 | Kempf et al. |
| 8,813,209 | B2 | 8/2014 | Bhattacharya et al. |
| 8,819,678 | B2 | 8/2014 | Tsirkin |
| 8,913,661 | B2 | 12/2014 | Koponen et al. |
| 8,966,024 | B2 | 2/2015 | Koponen et al. |
| 8,966,029 | B2 | 2/2015 | Zhang et al. |
| 8,966,035 | B2 | 2/2015 | Casado et al. |
| 9,015,823 | B2 | 4/2015 | Koponen et al. |
| 9,104,458 | B1 | 8/2015 | Brandwine et al. |
| 9,172,603 | B2 | 10/2015 | Padmanabhan et al. |
| 9,195,491 | B2 | 11/2015 | Zhang et al. |
| 9,306,909 | B2 | 4/2016 | Koponen et al. |
| 9,329,886 | B2 | 5/2016 | Vincent |
| 9,448,821 | B2 | 9/2016 | Wang |
| 9,552,219 | B2 | 1/2017 | Zhang et al. |
| 9,558,027 | B2 | 1/2017 | Zhang et al. |
| 9,697,030 | B2 | 6/2017 | Koponen et al. |
| 9,697,033 | B2 | 7/2017 | Koponen et al. |
| 2001/0043614 | A1 | 11/2001 | Viswanadham et al. |
| 2002/0034189 | A1 | 3/2002 | Haddock et al. |
| 2002/0093952 | A1 | 7/2002 | Gonda |
| 2002/0161867 | A1 | 10/2002 | Cochran et al. |
| 2002/0194369 | A1 | 12/2002 | Rawlins et al. |
| 2003/0009559 | A1 | 1/2003 | Ikeda |
| 2003/0058850 | A1 | 3/2003 | Rangarajan et al. |
| 2003/0093481 | A1 | 3/2003 | Mitchell et al. |
| 2003/0069972 | A1 | 4/2003 | Yoshimura et al. |
| 2003/0079000 | A1 | 4/2003 | Chamberlain |
| 2003/0131116 | A1 | 7/2003 | Jain et al. |
| 2004/0049701 | A1 | 3/2004 | Le Pennec et al. |
| 2004/0054793 | A1 | 3/2004 | Coleman |
| 2004/0073659 | A1 | 4/2004 | Rajsic et al. |
| 2004/0098505 | A1 | 5/2004 | Clemmensen |

(56) References Cited

U.S. PATENT DOCUMENTS

| | | |
|---|---|---|
| 2004/0131059 A1 | 7/2004 | Ayyakad et al. |
| 2005/0013280 A1 | 1/2005 | Buddhikot et al. |
| 2005/0018669 A1 | 1/2005 | Arndt et al. |
| 2005/0021683 A1 | 1/2005 | Newton et al. |
| 2005/0027881 A1 | 2/2005 | Figueira et al. |
| 2005/0050377 A1 | 3/2005 | Chan et al. |
| 2005/0060365 A1 | 3/2005 | Robinson et al. |
| 2005/0083953 A1 | 4/2005 | May |
| 2005/0132030 A1* | 6/2005 | Hopen et al. .................. 709/223 |
| 2005/0249199 A1 | 11/2005 | Albert et al. |
| 2006/0026225 A1 | 2/2006 | Canali et al. |
| 2006/0092976 A1 | 5/2006 | Lakshman et al. |
| 2006/0215684 A1 | 9/2006 | Capone et al. |
| 2006/0221961 A1 | 10/2006 | Basso et al. |
| 2007/0101323 A1 | 5/2007 | Foley et al. |
| 2007/0101421 A1 | 5/2007 | Wesinger, Jr. et al. |
| 2007/0140128 A1 | 6/2007 | Klinker et al. |
| 2007/0233838 A1 | 10/2007 | Takamoto et al. |
| 2007/0239987 A1 | 10/2007 | Hoole et al. |
| 2007/0266433 A1 | 11/2007 | Moore |
| 2007/0283348 A1 | 12/2007 | White |
| 2007/0286185 A1* | 12/2007 | Eriksson et al. ............... 370/389 |
| 2008/0002579 A1 | 1/2008 | Lindholm et al. |
| 2008/0005293 A1 | 1/2008 | Bhargava et al. |
| 2008/0049621 A1 | 2/2008 | McGuire et al. |
| 2008/0071900 A1 | 3/2008 | Hecker et al. |
| 2008/0072305 A1 | 3/2008 | Casado et al. |
| 2008/0151893 A1 | 6/2008 | Nordmark et al. |
| 2008/0163207 A1 | 7/2008 | Reumann et al. |
| 2008/0186990 A1 | 8/2008 | Abali et al. |
| 2008/0189769 A1 | 8/2008 | Casado et al. |
| 2008/0196100 A1 | 8/2008 | Madhavan et al. |
| 2008/0205377 A1 | 8/2008 | Chao et al. |
| 2008/0225853 A1 | 9/2008 | Melman et al. |
| 2008/0232250 A1* | 9/2008 | Park .............................. 370/235 |
| 2008/0240122 A1 | 10/2008 | Richardson et al. |
| 2008/0281908 A1 | 11/2008 | McCanne et al. |
| 2009/0025077 A1 | 1/2009 | Trojanowski |
| 2009/0031041 A1 | 1/2009 | Clemmensen |
| 2009/0063750 A1 | 3/2009 | Dow |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0129271 A1 | 5/2009 | Ramankutty et al. |
| 2009/0150527 A1 | 6/2009 | Tripathi et al. |
| 2009/0161547 A1* | 6/2009 | Riddle et al. .................. 370/236 |
| 2009/0199177 A1 | 8/2009 | Edwards et al. |
| 2009/0240924 A1 | 9/2009 | Yasaki et al. |
| 2009/0249470 A1* | 10/2009 | Litvin ................. H04L 63/0263 726/13 |
| 2009/0249472 A1 | 10/2009 | Litvin et al. |
| 2009/0249473 A1 | 10/2009 | Cohn |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2009/0327464 A1 | 12/2009 | Archer et al. |
| 2009/0327781 A1 | 12/2009 | Tripathi |
| 2010/0046530 A1 | 2/2010 | Hautakorpi et al. |
| 2010/0046531 A1 | 2/2010 | Louati et al. |
| 2010/0128623 A1 | 3/2010 | Dunn et al. |
| 2010/0098092 A1 | 4/2010 | Luo et al. |
| 2010/0115080 A1 | 5/2010 | Kageyama |
| 2010/0115101 A1 | 5/2010 | Lain et al. |
| 2010/0125667 A1 | 5/2010 | Soundararajan |
| 2010/0131636 A1 | 5/2010 | Suri et al. |
| 2010/0131638 A1 | 5/2010 | Kondamuru |
| 2010/0138830 A1 | 6/2010 | Astete et al. |
| 2010/0153554 A1 | 6/2010 | Anschutz et al. |
| 2010/0162036 A1 | 6/2010 | Linden et al. |
| 2010/0165876 A1 | 7/2010 | Shukla et al. |
| 2010/0165877 A1 | 7/2010 | Shukla et al. |
| 2010/0169467 A1 | 7/2010 | Shukla et al. |
| 2010/0214949 A1 | 8/2010 | Smith et al. |
| 2010/0254385 A1 | 10/2010 | Sharma et al. |
| 2010/0257263 A1 | 10/2010 | Casado et al. |
| 2010/0275199 A1 | 10/2010 | Smith et al. |
| 2010/0284402 A1 | 11/2010 | Narayanan |
| 2010/0287548 A1 | 11/2010 | Zhou et al. |
| 2010/0306408 A1 | 12/2010 | Greenberg et al. |
| 2010/0318665 A1 | 12/2010 | Demmer et al. |
| 2010/0322255 A1 | 12/2010 | Hao et al. |
| 2011/0002346 A1 | 1/2011 | Wu |
| 2011/0004698 A1 | 1/2011 | Wu |
| 2011/0004876 A1 | 1/2011 | Wu et al. |
| 2011/0004877 A1 | 1/2011 | Wu |
| 2011/0022695 A1 | 1/2011 | Dalal et al. |
| 2011/0026521 A1 | 2/2011 | Gamage et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0085563 A1 | 4/2011 | Kotha et al. |
| 2011/0119748 A1 | 5/2011 | Edwards et al. |
| 2011/0197039 A1 | 8/2011 | Green et al. |
| 2011/0225594 A1 | 9/2011 | Iyengar et al. |
| 2011/0255538 A1 | 10/2011 | Srinivasan et al. |
| 2011/0261825 A1 | 10/2011 | Ichino |
| 2011/0289230 A1 | 11/2011 | Ueno |
| 2011/0299534 A1 | 12/2011 | Koganti et al. |
| 2011/0299538 A1 | 12/2011 | Maruta |
| 2011/0310899 A1 | 12/2011 | Alkhatib et al. |
| 2012/0011264 A1 | 1/2012 | Izawa |
| 2012/0014386 A1 | 1/2012 | Xiong et al. |
| 2012/0144014 A1 | 6/2012 | Natham et al. |
| 2012/0155266 A1* | 6/2012 | Patel et al. .................... 370/235 |
| 2012/0236734 A1 | 9/2012 | Sampath et al. |
| 2012/0240182 A1 | 9/2012 | Narayanaswamy et al. |
| 2012/0246637 A1 | 9/2012 | Kreeger et al. |
| 2012/0281540 A1 | 11/2012 | Khan et al. |
| 2013/0003735 A1 | 1/2013 | Chao et al. |
| 2013/0019015 A1 | 1/2013 | Devarakonda et al. |
| 2013/0036416 A1 | 2/2013 | Raju et al. |
| 2013/0041987 A1 | 2/2013 | Warno |
| 2013/0054761 A1 | 2/2013 | Kempf et al. |
| 2013/0058250 A1* | 3/2013 | Casado ............... H04L 12/4633 370/254 |
| 2013/0058350 A1 | 3/2013 | Fulton |
| 2013/0061047 A1 | 3/2013 | Sridharan et al. |
| 2013/0073743 A1 | 3/2013 | Ramasamy et al. |
| 2013/0074181 A1 | 3/2013 | Singh |
| 2013/0103834 A1 | 4/2013 | Dzerve et al. |
| 2013/0121209 A1 | 5/2013 | Padmanabhan et al. |
| 2013/0125120 A1 | 5/2013 | Zhang et al. |
| 2013/0125230 A1 | 5/2013 | Koponen et al. |
| 2013/0128891 A1 | 5/2013 | Koponen et al. |
| 2013/0132531 A1 | 5/2013 | Koponen et al. |
| 2013/0132532 A1 | 5/2013 | Zhang et al. |
| 2013/0132536 A1 | 5/2013 | Zhang et al. |
| 2013/0163427 A1 | 6/2013 | Beliveau et al. |
| 2013/0163475 A1 | 6/2013 | Beliveau et al. |
| 2013/0163594 A1 | 6/2013 | Sharma et al. |
| 2013/0227097 A1 | 8/2013 | Yasuda et al. |
| 2013/0332619 A1 | 12/2013 | Xie et al. |
| 2013/0332983 A1 | 12/2013 | Koorevaar et al. |
| 2014/0016501 A1 | 1/2014 | Kamath et al. |
| 2014/0019639 A1 | 1/2014 | Ueno |
| 2014/0068602 A1 | 3/2014 | Gember et al. |
| 2014/0153577 A1 | 6/2014 | Janakiraman et al. |
| 2014/0169375 A1 | 6/2014 | Khan et al. |
| 2014/0195666 A1 | 7/2014 | Dumitriu et al. |
| 2014/0359620 A1 | 12/2014 | Kerkwyk et al. |
| 2015/0081861 A1 | 3/2015 | Koponen et al. |
| 2015/0098360 A1 | 4/2015 | Koponen et al. |
| 2015/0124651 A1 | 5/2015 | Zhang et al. |
| 2015/0142938 A1 | 5/2015 | Koponen et al. |
| 2015/0222598 A1 | 8/2015 | Koponen et al. |
| 2017/0116023 A1 | 4/2017 | Zhang et al. |
| 2017/0126493 A1 | 5/2017 | Zhang et al. |
| 2017/0277557 A1 | 9/2017 | Koponen et al. |

FOREIGN PATENT DOCUMENTS

| | | |
|---|---|---|
| CN | 1886962 A | 12/2006 |
| EP | 1653688 | 5/2006 |

(56) References Cited

FOREIGN PATENT DOCUMENTS

| | | |
|---|---|---|
| EP | 2395712 A1 | 12/2011 |
| EP | 2748713 | 7/2014 |
| EP | 2748714 | 7/2014 |
| EP | 2748716 | 7/2014 |
| EP | 2748717 | 7/2014 |
| EP | 2748750 | 7/2014 |
| EP | 2748978 | 7/2014 |
| JP | 2000332817 A | 11/2000 |
| JP | 2003-124976 | 4/2003 |
| JP | 2003-318949 | 11/2003 |
| JP | 2005260299 A | 9/2005 |
| JP | 2011188433 A | 9/2011 |
| JP | 2011211502 A | 10/2011 |
| JP | 2012525017 A | 10/2012 |
| WO | WO 99/18534 | 4/1999 |
| WO | WO 2005/112390 | 11/2005 |
| WO | WO 2008/095010 | 8/2008 |
| WO | 2010090182 A1 | 8/2010 |
| WO | 2010116606 A1 | 10/2010 |
| WO | 2012051884 A1 | 4/2012 |

OTHER PUBLICATIONS

Das, Suarav, et al., "Unifying Packet and Circuit Switched Networks with OpenFlow," Dec. 7, 2009, 10 pages.
Das, Suarav, et al. "Simple Unified Control for Packet and Circuit Networks," Month Unknown, 2009, pp. 147-148, IEEE.
Davie, B., et al., "A Stateless Transport Tunneling Protocol for Network Virtualization (STT)," Mar. 5, 2012, pp. 1-19, Nicira Networks, Inc., available at http://tools.ietf.org/html/draft-davie-stt-01.
Foster, Nate, et al., "Frenetic: A Network Programming Language," ICFP '11, Sep. 19-21, 2011, 13 pages, Tokyo, Japan.
Laurent, Ciavaglia, et al., "Autonomic network engineering for the self-managing Future Internet (AFI); Generic Autonomic Network Architecture (An Architectural Reference Model for Autonomic Networking, Cognitive Networking and Self-Management)," Apr. 2013, ETSI, France, Part 1 of 2, pp. 1-79.
Laurent, Ciavaglia, et al., "Autonomic network engineering for the self-managing Future Internet (AFI); Generic Autonomic Network Architecture (An Architectural Reference Model for Autonomic Networking, Cognitive Networking and Self-Management)," Apr. 2013, ETSI, France, Part 2 of 2, pp. 80-167.
Loo, Boon Thau, et al., "Declarative Routing: Extensible Routing with Declarative Queries," In Proc. of SIGCOMM, Aug. 21-26, 2005, 14 pages, Philadelphia, PA, USA.
Loo, Boon Thau, et al., "Implementing Declarative Overlays," In Proc. of SOSP, Oct. 2005, 16 pages, Brighton, UK.
Sekar, Vyas, et al., "Design and Implementation of a Consolidated Middlebox Architecture," In Proc. of NSDI, Month Unknown, 2012, 14 pages.
Shenker, Scott, et al., "The Future of Networking, and the Past of Protocols," Dec. 2, 2011, pp. 1-30, USA.
Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.
WO 2013/074847 with International Search Report, dated May 23, 2013, Nicira, Inc.
WO 2013/074831 with International Search Report, dated May 23, 2013, Nicira, Inc.
WO 2013/074855 with International Search Report, dated May 23, 2013, Nicira, Inc.
WO 2013/074827 with International Search Report, dated May 23, 2013, Nicira, Inc.
WO 2013/074844 with International Search Report, dated May 23, 2013, Nicira, Inc.
WO 2013/074828 with International Search Report, dated May 23, 2013, Nicira, Inc.
WO 2013/074842 with International Search Report, dated May 23, 2013, Nicira, Inc.

Andersen, David, et al., "Resilient Overlay Networks," Oct. 2001, 15 pages, 18th ACM Symp. On Operating Systems Principles (SOSP), Banff, Canada, ACM.
Anderson, Thomas, et al., "Overcoming the Internet Impasse through Virtualization," Apr. 2005, pp. 34-41, IEEE Computer Society.
Anhalt, Fabienne, et al., "Analysis and evaluation of a XEN based virtual router," Sep. 2008, pp. 1-60, Unite de recherché INRA Phone-Alpes, Montbonnot Saint-Ismier, France.
Author Unknown , "Cisco Nexis 1000V Series Switches," Date Unknown but prior to Jul. 29, 2010, 2 pages, Cisco Systems, Inc., http://web.archive.org/web/20100729045626/http://www.cisco.com/en/US/Products/ps9902/index.html.
Author Unknown , "Cisco VN-Link: Virtualization-Aware Networking," Month Unknown, 2009, 10 pages, Cisco Systems, Inc.
Author Unknown, "Cisco VN-Link: Virtual Machine-Aware Networking," Apr. 2009, 2 pages, Cisco Systems, Inc.
Author Unknown, "Intel 82599 10 Gigabit Ethernet Controller: Datasheet, Revision: 2.73," Dec. 2011, 930 pages, Intel Corporation.
Author Unknown, "Virtual Machine Device Queues," White Paper, Month Unknown, 2007, pp. 1-4, Intel Corporation.
Author Unknown , "VMare for Linux Networking Support," Date Unknown but prior to Nov. 17, 1999, pp. 1-5, VMWare, Inc.
Barham, Paul, et al., "Xen and the Art of Virtualization," Oct. 19-22, 2003, pp. 1-14, SOSP'03, Bolton Landing New York, USA.
Cai, Zheng, et al., "The Preliminary Design and Implementation of the Maestro Network Control Platform," Oct. 1, 2008, pp. 1-17, NSF.
Casado, Martin, et al. "Ethane: Taking Control of the Enterprise," SIGCOMM'07, Aug. 27-31, 2007, pp. 1-12, ACM, Kyoto, Japan.
Casado, Martin, et al., "Rethinking Packet Forwarding Hardware," Seventh ACM SIGCOMM' HotNets Workshop, Nov. 2008, pp. 1-6, ACM.
Casado, Martin, et al., "SANE: A Protection Architecture for Enterprise Networks," In proceedings of Usenix Security, Aug. 2006, pp. 1-15.
Casado, Martin, et al., "Scaling Out: Network Virtualization Revisited," Month Unknown, 2010, pp. 1-8.
Casado, Martin, et al., "Virtualizing the Network Forwarding Plane," Dec. 2010, pp. 1-6.
Congdon, Paul, "Virtual Ethernet Port Aggregator Standards body Discussion," Nov. 10, 2008, pp. 1-26, HP.
Davoli, Renzo, "VDE: Virtual Distributed Ethernet," TRIDENTCOM'05, Feb. 23-25, 2005, pp. 1-8, IEEE Computer Society.
Dixon, Colin, et al., "An End to the Middle," Proceedings of the 12th conference on Hot topics in operating systems USENIX Association, May 2009, pp. 1-5, Berkeley, CA, USA.
Dobrescu, Mihai, et al., "RouteBricks: Exploiting Parallelism to Scale Software Routers," SOSP'09, Proceedings of the ACM SIGOPS 22nd Symposium on Operating Systems Principles, Oct. 2009, pp. 1-17, ACM New York, NY.
Farrel, A., "A Path Computation Element (PCS)—Based Architecture," Aug. 2006, pp. 1-41, RFC 4655.
Fischer, Anna, "[Patch][RFC] net/bridge: add basic VEPA support," Jun. 2009, pp. 1-5, GMANE Org.
Garfinkel, Tal, et al., "A Virtual Machine Introspection Based Architecture for Intrusion Detection," In Proc. Network and Distributed Systems Security Symposium, Feb. 2003, pp. 1-16.
Greenberg, Albert, et al., "A Clean Slate 4D Approach to Network Control and Management," ACM SIGCOMM Computer Communication Review, Oct. 2005, 12 pages, vol. 35, No. 5.
Greenberg, Albert, et al., "VL2: A Scalable and Flexible Data Center Network," SIGCOMM'09, Aug. 17-21, 2009, pp. 51-62, ACM, Barcelona, Spain.
Greenhalgh, Adam, et al., "Flow Processing and the Rise of Commodity Network Hardware," ACM SIGCOMM Computer Communication Review, Apr. 2009, pp. 21-26, vol. 39, No. 2.
Gude, Natasha, et al., "NOX: Towards an Operating System for Networks," ACM SIGCOMM Computer communication Review, Jul. 2008, pp. 105-110, vol. 38, No. 3.

(56) References Cited

OTHER PUBLICATIONS

Guo, Chanxiong, et al., "BCube: A High Performance, Server-centric Network Architecture for Modular Data Centers," SIGCOMM'09, Aug. 17-21, 2009, pp. 1-12, ACM, Barcelona, Spain.
Hinrichs, Timothy L., et al., "Practical Declarative Network Management," WREN'09, Aug. 21, 2009, pp. 1-10, Barcelona, Spain.
Ioannidis, Sotiris, et al., "Implementing a Distributed Firewall," CCS'00, Month Unknown, 2000, pp. 1-10, ACM, Athens, Greece.
Joseph, Dilip, et al., "A Policy-aware Switching Layer for Date Centers," Jun. 24, 2008, 26 pages, Electrical Engineering and Computer Sciences, University of California, Berkeley, CA, USA.
Kamath, Daya, et. al., "Edge virtual Bridge Proposal, Version 0. Rev. 0.1," Apr. 23, 2010, pp. 1-72, IEEE.
Keller, Eric, et al., "The 'Platform as a Service' Model for Networking," Month Unknown, 2010, pp. 1-6.
Koponen, Teemu, et al., "Onix: A Distributed Control Platform for Large-scale Production Networks," In Proc. OSDI, Oct. 2010, pp. 1-14.
Lakshminarayanan, Karthik, et al., "Routing as a Service," Month Unknown, 2004, pp. 1-15, Berkeley, California.
Luo, Jianying, et al., "Prototyping Fast, Simple, Secure Switches for Ethane," Month Unknown, 2007, pp. 1-6.
McKeown, Nick, et al., "OpenFlow: Enabling Innovation in Campus Networks," ACS SIGCOMM Computer communication Review, Apr. 2008, pp. 69-74, vol. 38, No. 2.
Mogul, Jeffrey C., et al., "API Design Challenges for Open Router Platforms on Proprietary Hardware," Oct. 2008, pp. 1-6.
Popa, Lucian, et al., "Building Extensible Networks with Rule-Based Forwarding," in USENIX OSDI, Month Unknown, 2010, pp. 1-14.
Yang, L., et al., "Forwarding and Control Element Separation (ForCES) Framework," Apr. 2004, pp. 1-40, The Internet Society.
Portions of prosecution history of U.S. Appl. No. 13/678,498, dated Jun. 25, 2014, Nicira, Inc.
Portions of prosecution history of U.S. Appl. No. 13/678,485, dated Jun. 26, 2014, Nicira, Inc.
Portions of prosecution history of U.S. Appl. No. 13/678,518, dated Aug. 18, 2014, Nicira, Inc.
Portions of prosecution history of U.S. Appl. No. 13/678,504, dated Jul. 9, 2014, Nicira, Inc.
Portions of prosecution history of U.S. Appl. No. 13/678,512, dated Jul. 23, 2014, Nicira, Inc.
International Preliminary Report on Patentability for PCT/US2012/065359, dated May 30, 2014, Nicira, Inc.
Wang, Wei-Ming, et al., "Analysis and Implementation of an Open Programmable Router Based on Forwarding and Control Element Separation," Sep. 2008, pp. 769-779, Journal of Computer Science and Technology.
U.S. Appl. No. 14/549,512, filed Nov. 20, 2014, Koponen, Teemu, et al.
U.S. Appl. No. 14/595,195, filed Jan. 12, 2015, Zhang, Ronghua, et al.
U.S. Appl. No. 14/595,199, filed Jan. 12, 2015, Koponen, Teemu, et al.
Updated portions of prosecution history of U.S. Appl. No. 13/678,518, dated Sep. 2, 2014, Koponen, Teemu, et al.
Updated portions of prosecution history of U.S. Appl. No. 13/678,504, dated Dec. 19, 2014, Koponen, Teemu, et al.
Updated portions of prosecution history of U.S. Appl. No. 13/678,512, dated Mar. 10, 2015, Padmanabhan, Amar, et al.
Updated portions of prosecution history of U.S. Appl. No. 13/678,498, dated Jan. 23, 2015, Koponen, Teemu, et al.
Updated portions of prosecution history of U.S. Appl. No. 13/678,485, dated Jan. 23, 2015, Zhang, Ronghua, et al.
Portions of prosecution history of U.S. Appl. No. 13/678,520, dated Feb. 11, 2015, Zhang, Ronghua, et al.
Portions of prosecution history of EP12849710.4, dated Jan. 12, 2015, Nicira, Inc.
Portions of prosecution history of EP12849295.6, dated Mar. 24, 2015, Nicira, Inc.
Portions of prosecution history of EP12849104.0, dated Jan. 30, 2015, Nicira, Inc.
Portions of prosecution history of AU2012340383, dated Mar. 19, 2015, Nicira, Inc.
Portions of prosecution history of EP12850519.5, dated Jan. 12, 2015, Nicira, Inc.
Portions of prosecution history of AU20123403, dated Mar. 17, 2015, Nicira, Inc.
Portions of prosecution history of EP12849015.8, dated Jan. 29, 2015, Nicira, Inc.
Portions of prosecution history of EP12850665.6, dated Oct. 9, 2014, Nicira, Inc.
Author Unknown, "Enabling Service Chaining on Cisco Nexus 1000V Series," Month Unknown, 2012, 25 pages, Cisco.
Dumitriu, Dan Mihai, et al. U.S. Appl. No. 61/514,990, filed Aug. 4, 2011.
Kent, S., "IP Encapsulating Security Payload (ESP)," Dec. 2005, pp. 1-44, The Internet Society.
Stiemerling, M., et al., "Middlebox Communication (MIDCOM) Protocol Semandtics," Mar. 2008, 70 pages, Internet Engineering Task Force.
Updated portions of prosecution history of EP12849710, dated Jul. 10, 2015, Nicira, Inc.
Updated portions of prosecution history of EP12849295, dated Sep. 23, 2015, Nicira, Inc.
Updated portions of prosecution history of EP12849104, dated Jul. 24, 2015, Nicira, Inc.
Updated portions of prosecution history of EP12850519, dated Jul. 7, 2015, Nicira, Inc.
Updated portions of prosecution history of EP12849015, dated Jul. 23, 2015, Nicira, Inc.
Updated portions of prosecution history of EP12850665, dated Nov. 11, 2015, Nicira, Inc.
Updated portions of prosecution history of AU2012340383, dated Dec. 3, 2015, Nicira, Inc.
Updated portions of prosecution history of AU2012340387, dated Dec. 3, 2015, Nicira, Inc.
Mahalingam, Malik, et al., "VXLAN: A Framework for Overlaying Virtualized Layer 2 Networks over Layer 3 Networks," draft-mahalingam-dutt-dcops-vxlan-00.txt, Aug. 26, 2011, 20 pages, IETF Trust.
Pettit, Justin, et al., "Virtual Switching in an Era of Advanced Edges," In Proc. 2nd Workshop on Data Center—Converged and Virtual Ethernet Switching (DCCAVES), Sep. 2010, 7 pages, vol. 22. ITC.
Pfaff, Ben, et al., "Extending Networking into the Virtualization Layer, " Sep. 30, 2009, 6 pages.

\* cited by examiner

CONTROL PLANE INTERFACE FOR LOGICAL MIDDLEBOX SERVICES

CLAIM OF BENEFIT TO PRIOR APPLICATION

This application claims the benefit of U.S. Provisional Application 61/560,279, entitled "Virtual Middlebox Services", filed Nov. 15, 2011. U.S. Application 61/560,279 is incorporated herein by reference.

BACKGROUND

Many current enterprises have large and sophisticated networks comprising switches, hubs, routers, middleboxes, servers, workstations and other networked devices, which support a variety of connections, applications and systems. The increased sophistication of computer networking, including virtual machine migration, dynamic workloads, multi-tenancy, and customer specific quality of service and security configurations require a better paradigm for network control. Networks have traditionally been managed through low-level configuration of individual network components. Network configurations often depend on the underlying network: for example, blocking a user's access with an access control list ("ACL") entry requires knowing the user's current IP address. More complicated tasks require more extensive network knowledge: forcing guest users' port 80 traffic to traverse an HTTP proxy requires knowing the current network topology and the location of each guest. This process is of increased difficulty where the network switching elements are shared across multiple users.

In response, there is a growing movement towards a new network control paradigm called Software-Defined Networking (SDN). In the SDN paradigm, a network controller, running on one or more servers in a network, controls, maintains, and implements control logic that governs the forwarding behavior of shared network switching elements on a per user basis. Making network management decisions often requires knowledge of the network state. To facilitate management decision-making, the network controller creates and maintains a view of the network state and provides an application programming interface upon which management applications may access a view of the network state.

Some of the primary goals of maintaining large networks (including both datacenters and enterprise networks) are scalability, mobility, and multi-tenancy. Many approaches taken to address one of these goals results in hampering at least one of the others. For instance, one can easily provide network mobility for virtual machines within an L2 domain, but L2 domains cannot scale to large sizes. Furthermore, retaining user isolation greatly complicates mobility. As such, improved solutions that can satisfy the scalability, mobility, and multi-tenancy goals are needed.

BRIEF SUMMARY

Some embodiments provide a non-transitory machine readable medium of a first middlebox element of several middlebox elements to implement a middlebox instance in a distributed manner in several hosts. The non-transitory machine readable medium stores a set of instructions for receiving (1) configuration data for configuring the middlebox instance to implement a middlebox in a logical network and (2) a particular identifier associated with the middlebox in the logical network. The non-transitory machine readable medium stores a set of instructions for generating (1) a set of rules to process packets for the middlebox in the logical network and (2) an internal identifier associated with the set of rules. The non-transitory machine readable medium stores a set of instructions for associating the particular identifier with the internal identifier for later processing of packets having the particular identifier.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a non-transitory machine readable medium of a first middlebox element of several middlebox elements to implement a middlebox instance in a distributed manner in several hosts. The non-transitory machine readable medium stores a set of instructions for receiving (1) configuration data for configuring the middlebox instance to implement a middlebox in a logical network and (2) a particular identifier associated with the middlebox in the logical network. The non-transitory machine readable medium stores a set of instructions for generating (1) a set of rules to process packets for the middlebox in the logical network and (2) an internal identifier associated with the set of rules. The non-transitory machine readable medium stores a set of instructions for associating the particular identifier with the internal identifier for later processing of packets having the particular identifier.

Several more detailed embodiments of the invention are described in the sections below. Section I conceptually describes details of several types of middlebox deployments in a logical network according to some embodiments of the invention. Next, Section II conceptually describes details of the managed network architecture that is used to implement a logical network according to some embodiments of the invention. Section III follows this with a description of a configuration data flow for the managed network architecture of some embodiments. Next, Section IV describes several logical processing examples according to some embodiments of the invention. Finally, Section V describes an electronic system that implements some embodiments of the invention.

I. Exemplary Deployment of Middleboxes

Figure 1:
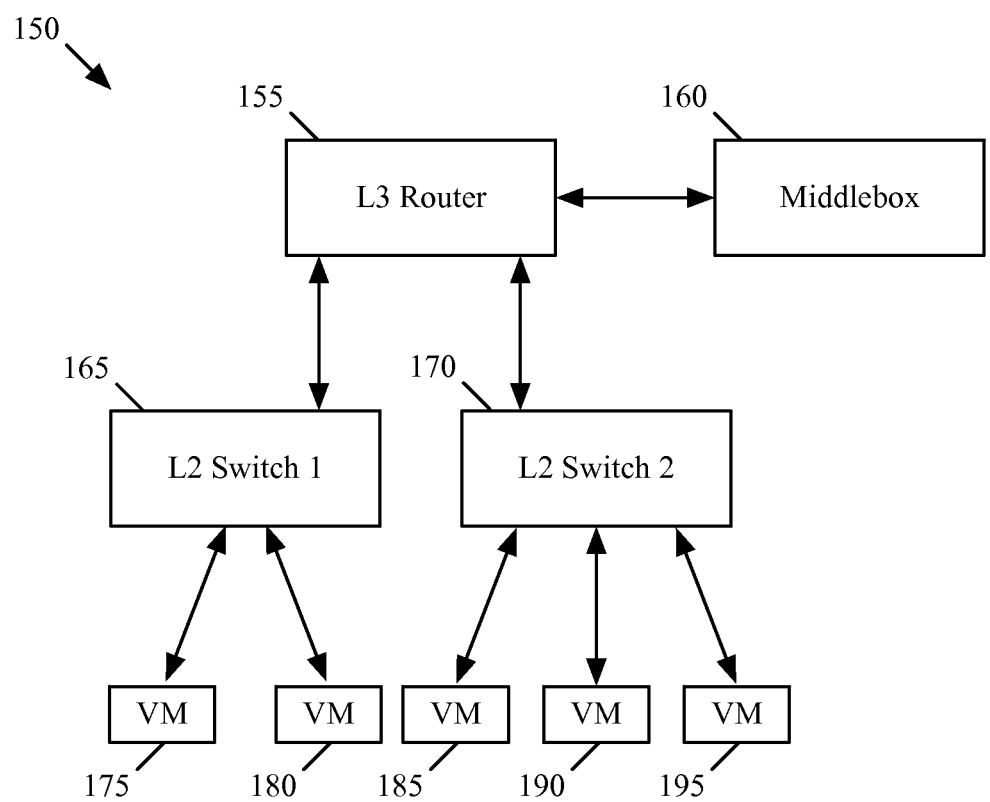
FIG. 1 conceptually illustrates an example deployment of a middlebox in a logical network according to some embodiments of the invention.

FIG. 1 conceptually illustrates an example deployment of a middlebox 160 in a logical network 150 according to some embodiments of the invention. Specifically, FIG. 1 illustrates the logical topology of the logical network 150 in which the middlebox 160 is deployed. In some embodiments, a user specifies the logical network 150 by providing input (e.g., through a network controller) that describes a logical datapath set (LDPS), which is implemented by a set of network infrastructure switching elements (not shown in FIG. 1).

In some embodiments, a logical data path set defines a logical network element. A logical data path set, in some embodiments, is a set of network data paths through the set of network infrastructure switching elements that implement the logical network element and the logical network element's defined functionalities. As such, the logical network 150 in this example is a conceptual representation of the LDPS specified by the user.

As shown, the logical network 150 includes a logical layer 3 (L3) router 155, the middlebox 160, logical layer 2 (L2) switches 165 and 170, and VMs 175-195. The L3 router 155 handles layer 3 routing of network data (e.g., packets) between the L2 switches 165 and 170 and the middlebox 160. The L2 switch 165 forwards network data between the L3 router 155 and the VMs 175 and 180 while the L2 switch 170 forwards network data between the L3 router 155 and the VMs 185-195.

The VMs 175-195 of some embodiments are host machines implemented as virtual machines running on separate and/or shared physical machines. The VMs 175-195 of some embodiments are each assigned a set of network layer host addresses (e.g., a MAC address for network layer 2, an IP address for network layer 3, etc.) and can send and receive network data to and from other network elements over the network.

In some embodiments, the middlebox 160 is a networking device that performs one or more operations (e.g., transforming, inspecting, filtering, manipulating, etc.) on network data for purposes other than forwarding of the network data. Examples of middleboxes include firewalls, intrusion detection systems, network address translators (e.g., source network address translators (SNATs), destination network address translators (DNATs), etc.), wide area network (WAN) optimizers, etc. In some embodiments, the middlebox 160 is a centralized middlebox that is implemented as a physical device, a set of physical devices (e.g., a cluster of physical devices), a virtual machine, a software application or module running on a computing device or a virtual machine, etc.

Alternatively, the middlebox 160 of some embodiments is a distributed middlebox that is implemented as several physical devices, sets of physical devices (e.g., clusters of physical devices), virtual machines, software applications or modules running on computing devices or virtual machines, or any combination of the aforementioned implementations. In some embodiments, a distributed middlebox shares some or state among the different devices implemented the distributed middlebox while, in other embodiments, the distributed middlebox does not need state sharing capabilities.

As shown in FIG. 1, the middlebox 160 is arranged as bounded or isolated by the L3 router 155 in the logical topology of the logical network 150. That is, network data must go through the L3 router 155 in order to reach the middlebox 160. As such, network data from within the logical network that is specified (1) to be sent over that WAN 130 and (2) to be processed by the middlebox 160 is sent to the middlebox 160 through the L3 router 155. After the middlebox 160 processes such network data, the data is sent back through the L3 router 155 for the L3 router 155 to route the processed network data to its specified destination (e.g., one of the VMs 175-195). One of ordinary skill in the art will realize that the logical topology of the logical network 150 is one exemplary logical network topology into which a middlebox is incorporated. Different embodiment use different logical topologies into which a middlebox is incorporated.

In some embodiments, the middlebox 160 generates a copy of the processed network data and sends the copy of the processed network data back to the L3 router 155 for routing to the network data's destination. In other words, the L3 router 155 receives back from the middlebox 160 new network data (new packets) that is generated by the middlebox 160. In some embodiments, the arrangement of the middlebox 160 is referred to as a one-armed out-of-path deployment or a one-arm deployment. The middlebox 160 of some embodiments processes the network data and does not send network data nor a copy of the processed network data back to the L3 router 155.

To control or direct different network data through the logical network 150, different embodiments use different techniques and/or criteria to forward and route the network data through the logical network 150. For instance, in some embodiments, packets are routed and/or forwarded through the logical network 150 based on the destination address (e.g., a media access control (MAC) address, an Internet protocol (IP) address, etc.) specified in the packets. Some embodiments employ policy-based routing, which uses additional and/or different criteria to determine the manner in which network data is routed and/or forwarded through the logical network 150. Examples of such criteria include the packet's source address, the size of the packet, the protocol of the packet's payload, and/or any other information available in a packet's header or the packet's payload. Additional and/or other techniques are used in some embodiments.

Figure 2:
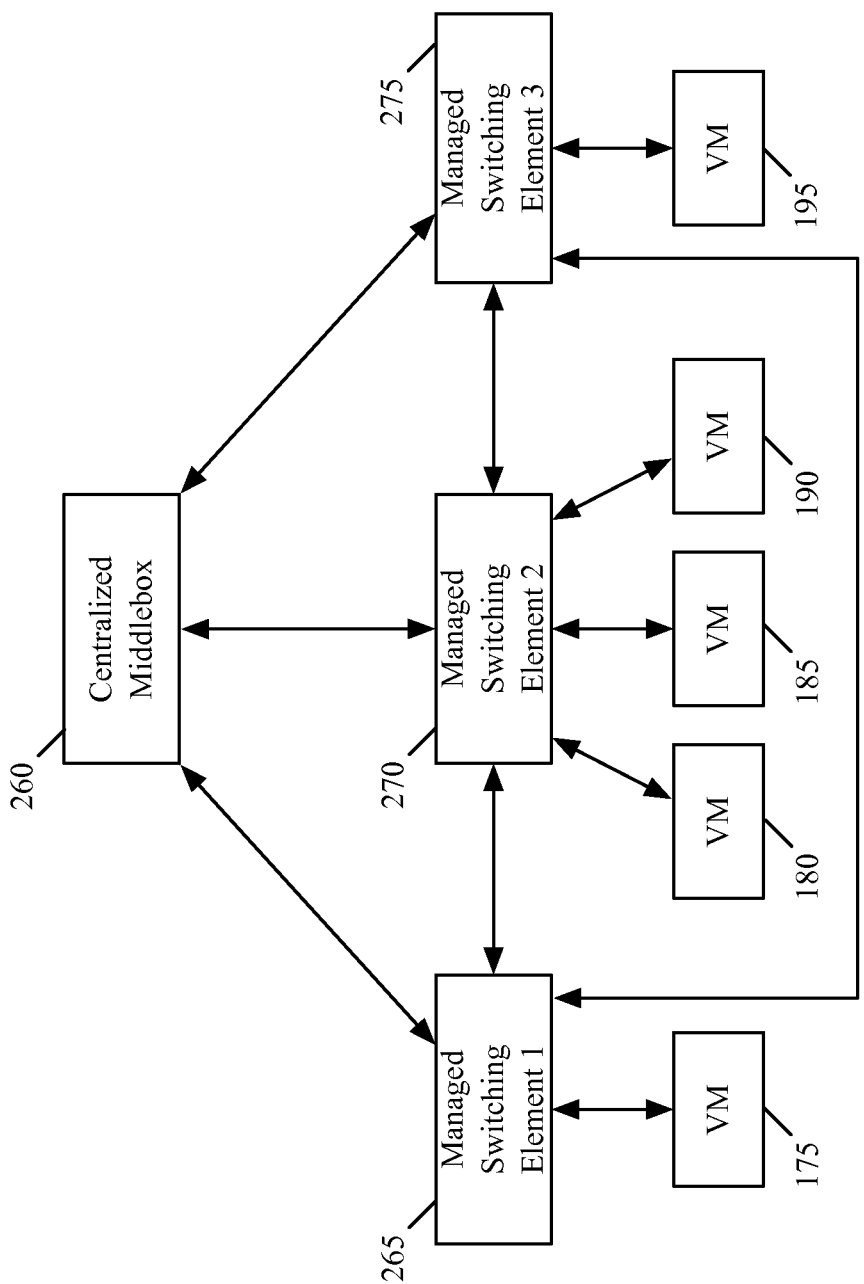
FIG. 2 conceptually illustrates a physical network architecture that implements the logical network illustrated in FIG. 1 according to some embodiments of the invention.

FIG. 2 conceptually illustrates a physical network architecture that implements the logical network 150 illustrated in FIG. 1 according to some embodiments of the invention. In particular, FIG. 2 illustrates an example of implementing the logical network 150 with a set of managed switching elements 265-275 and a centralized middlebox 260.

In some embodiments, the centralized middlebox 260 implements the middlebox 160 in the logical network 150. The centralized middlebox 260 of some embodiments performs one or more operations (e.g., transforming, inspecting, filtering, manipulating, etc.) on network data for purposes other than forwarding of the network data. Examples of middleboxes include firewalls, intrusion detection systems, network address translators (e.g., source network address translators (SNATs), destination network address translators (DNATs), etc.), wide area network (WAN) optimizers, etc. The centralized middlebox 260 of some embodiments is implemented as a physical device, a set of physical devices (e.g., a cluster of physical devices), a virtual machine, a software application or module running on a computing device or a virtual machine, etc. In some embodiments, the centralized middlebox 260 and the managed switching elements 265-275 communicate with each of through tunnels (e.g., a generic routing encapsulation (GRE) tunnel, a Control And Provisioning of Wireless Access Points (CAPWAP) tunnel, a web cache communication protocol (WCCP) tunnel, etc.).

In some embodiments, the centralized middlebox 260 is used to implement multiple middleboxes (e.g., different middleboxes for the same logical network, different middleboxes for different logical networks, etc.). The centralized middlebox 260 of some embodiments creates a middlebox instance (also referred to as a middlebox slice) for each middlebox that the centralized middlebox 260 is requested to implement and associates the middle instance with a unique identifier (e.g., a unique identifier included in the slicing data described below).

The managed switching elements 265-275 of some embodiments are switching elements that forward and route network data between network elements coupled to the managed switching elements 265-275. In some embodiments each of the managed switching elements 265-275 is implemented as a physical switching element, a virtual switching element, a software switching element (e.g., an OVS switching element), or any other type of network element that is capable of forwarding and routing network data.

In some embodiments, the managed switching elements 265-275 are referred to as edge switching elements because they are managed switching elements at the edge of the network infrastructure. That is, the managed switching elements 265-275 are directly connected to network hosts (the VMs 175-195 in this example).

As described above by reference to FIG. 1, a user in some embodiments specifies the logical network 150 by providing input that describes an LDPS, which is conceptually represented by the logical network 150 and is implemented by a set of managed switching elements. For this example, the managed switching elements 265-275 and the centralized middlebox 250 are used to implement the LDPS. As explained below, to configure the set of managed switching elements, the network control system of some embodiments receives input from the user and converts the user-provided data into logical control plane (LCP) data, and then converts the LCP data into logical forward plane (LFP) data, which the network control system in turn converts into physical control plane (PCP) data. The network control system sends the PCP data to the set of managed switching elements (the managed switching elements 265-275 in this example) to convert to physical forwarding plane (PFP) data in order to implement the LDPS described by the user-provided LCP data.

In some embodiments, the network control system converts the LFP data to universal PCP (UPCP) data. UPCP data in some embodiments is a data plane that enables the control system of some embodiments to scale even when it contains a large number of managed switching elements (e.g., thousands) to implement a LDPS. The UPCP abstracts common characteristics of different managed switching elements in order to express PCP data without considering differences in the managed switching elements and/or location specifics of the managed switching elements.

In some embodiments, network control system translates the UPCP data into customized PCP (CPCP) data for each managed switching element in order to completely implement LDPSs at the managed switching elements. In some such embodiments, the network control system (1) generates CPCP data for each managed switching element by expanding the UPCP data to characteristics specific and/or local to the managed switching element (e.g., ports on the managed switching element) and (2) sends the CPCP data to the managed switching element.

Instead of generating CPCP for each of the managed switching elements, the network control system of some embodiments sends the UPCP data to each of the managed switching elements for the managed switching element to each generate its own CPCP data, which is used to generate PFP data for the managed switching element. To communicate with and configure the managed switching elements, the network control system of some embodiments uses the OpenFlow or OVS application programming interfaces (APIs) provided by the managed switching elements.

In some embodiments, the user provides to the network control system middlebox configuration data for configuring the middlebox 160 in the logical network 150. For instance, when the user specifies for the middlebox 160 to serve as a firewall, the user provides filters (e.g., packet filters, stateful filters, application layer filters, etc.) for the middlebox 160. As another example, when the user specifies the middlebox 160 to serve as a load balancer, the user provides network address data (e.g., virtual IPs, real IPs, application layer filters, etc.) and/or load balancing data (e.g., balancing algorithm, port rules, etc.) for the middlebox 160.

To configure the centralized middlebox 260, the network control system of some embodiments pushes the user-provided middlebox configuration data to the middlebox through a set of APIs provided by the middlebox. In some embodiments, the network control system also pushes attachment data along with the middlebox configuration data to the middlebox through the set of APIs. In some embodiments, the attachment data for the centralized middlebox 260 includes a tunnel type (e.g., a GRE tunnel, a CAPWAP tunnel, a WCCP tunnel, etc.) for the centralized middlebox 260 to use for sending to and receiving from network data to each of the managed switching elements 265-275. The tunnel type is specified by the user as part of the middlebox configuration data in some embodiments while the network control system automatically determines the tunnel type in other embodiments.

In some embodiments, the network control system generates slicing data for the centralized middlebox 260 and pushes this data along with the middlebox configuration data to the centralized middlebox 260 through the set of APIs. The slicing data of some embodiments includes a unique identifier associated with a middlebox in a logical network (e.g., the middlebox 160 in the logical network 150 described above by reference to FIG. 1). In some embodiments, the centralized middlebox 260 uses the unique identifiers of slicing data to implement (1) different middleboxes for a particular logical network and/or (2) different middleboxes for multiple different logical networks.

FIG. 2 shows the centralized middlebox 260 directly connected to the managed switching elements 265-275 (via tunnels). The managed switching elements 265-275 are directly connected to the VMs 175-195, which are not directly connected to the centralized middlebox 260. Therefore, network data that is specified to be sent to the centralized middlebox 260 must pass through the managed switching elements 265-275. For instance, network data communicated between any of the VMs 180-190 in the physical network architecture and the centralized middlebox 260 is sent through the managed switching elements 270 in order to reach the centralized middlebox 260. That is, the managed switching element 270 forwards the network data received from the VMs 180-190 to the centralized middlebox 260.

When the network data reaches the centralized middlebox 260, the centralized middlebox 260 performs its configured functions on the network data. Based on the configured functions of the centralized middlebox 260, the centralized middlebox 260 of some embodiments sends the network data (or a copy of the network data) to a pool node (not shown in FIG. 2), such as the pool node described by below by reference to FIG. 3, to perform the first-hop logical processing on the network data and forward the network data to its destination (e.g. one of the VMs 170-190) while, the centralized middlebox 260 of other embodiments does not send the network data back to the managed switching element 270.

In some embodiments, once the centralized middlebox 260 performs its configured functions on the network data, the centralized middlebox 260 forwards the network data to its destination (e.g. one of the VMs 170-190). For instance, in some embodiments where the managed switching elements 265-275 and the centralized middlebox 260 are used to implement a logical network that includes a logical L2 switch and a logical middlebox, the centralized middlebox 260 of some embodiments performs the logical processing (i.e. L2 logical processing) on the network data. Based on the logical forwarding decision, the centralized middlebox 260 forwards the network data to the appropriate managed switching element for forwarding to its destination (e.g. one of the VMs 170-190)

Figure 3:
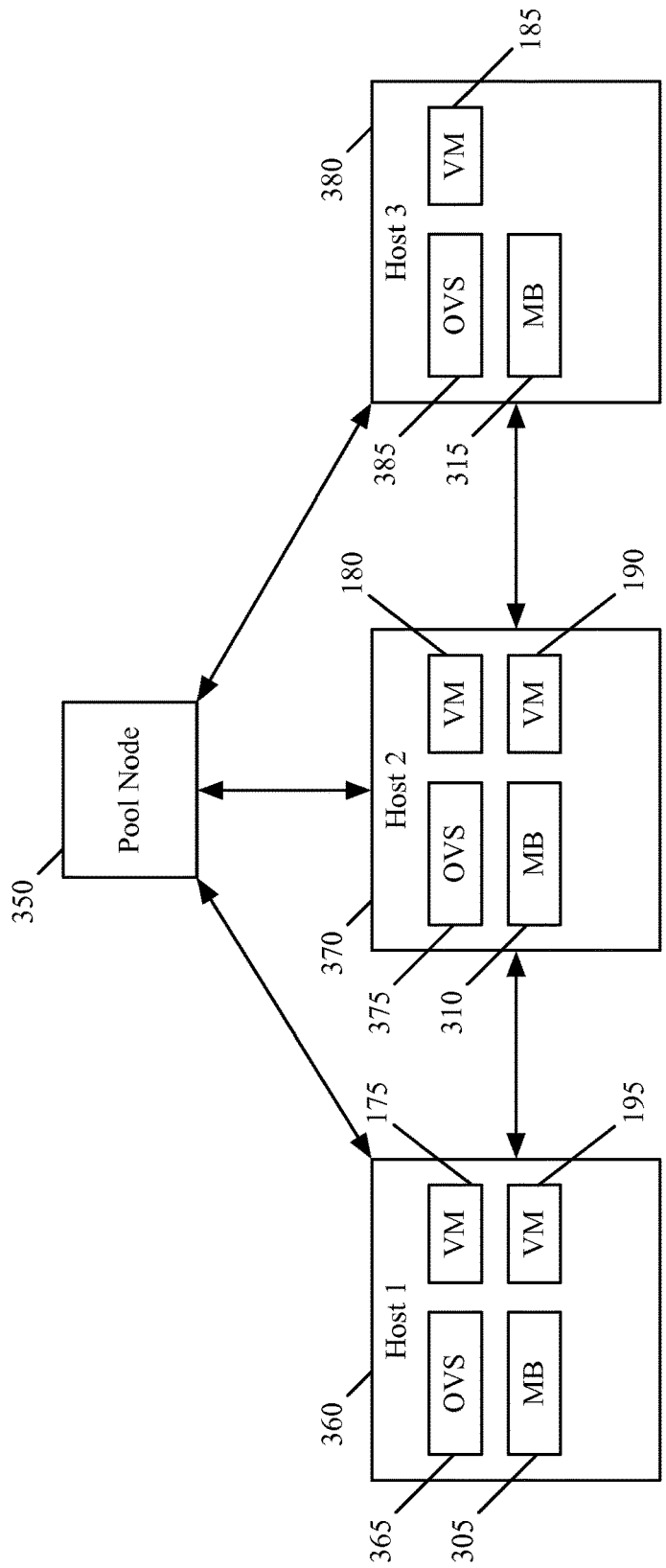
FIG. 3 conceptually illustrates another physical network architecture that implements the logical network illustrated in FIG. 1 according to some embodiments of the invention.

FIG. 3 conceptually illustrates a physical network architecture that implements the logical network illustrated in FIG. 1 according to some embodiments of the invention. Specifically, FIG. 3 illustrates an example of implementing the logical network 150 with a set of software switching elements and a distributed middlebox.

The physical network architecture FIG. 3 illustrates a pool node 350 and hosts 360-380. In some embodiments, the hosts 360-380 are physical machines (e.g., computing devices, such as computer system) in some embodiments. As shown, the hosts 360-380 each includes a software switching element referred to as an Open Virtual Switch (OVS) for forwarding and routing network data between network elements coupled to the OVSs 365-385 (the VMs 175-195 and the pool node 350 in this example). In some embodiments, the OVSs 365-385 operate in a virtual machine running on the hosts 360-380.

The OVSs 365-385 of some embodiments are referred to as edge switching elements because they are managed switching elements at the edge of the network infrastructure. That is, the OVSs 365-385 are directly connected to network hosts (the VMs 175-195 in this example). In contrast, a non-edge switching element (the pool node 350 in this example) is a switching element that interconnects the edge switching elements. In some embodiments, non-edge switching elements are referred to as interior switching elements. Additionally, in some embodiments, the pool node 350 and the OVSs 365-385 are referred to as managed switching elements as they are managed by a network control system in some embodiments (as opposed to unmanaged switches, which are not managed by the network control system, in the network) in order to implement the logical network 150. Each of the OVSs 365-385 communicates with each of the other OVSs through tunnels (e.g., a GRE tunnel, a CAPWAP tunnel, a WCCP tunnel, etc.) in some embodiments.

In some embodiments, the pool node 350 is a managed switching element located at the network interior (i.e., not directly connected to any of the VMs 175-195) that facilitates communication between the VMs 175-195 by processing packets received from the OVSs 365-385 that the OVSs 365-385 cannot process. In some embodiments, the pool node 350 is implemented as a physical machine (e.g., a computing device, such as computer system) while, in other embodiments, the pool node 350 is implemented as a virtual machine (not shown in FIG. 3) running on a physical machine. The pool node 350 of some embodiments includes an OVS (not shown in FIG. 3) for forwarding and routing network data between network elements coupled to the pool node 350 (the OVSs 365-375 in this example). In some embodiments, the pool node 350 and the OVSs 365-375 communicate with each other through a tunnel (e.g., a generic routing encapsulation (GRE) tunnel, a Control And Provisioning of Wireless Access Points (CAPWAP) tunnel, a web cache communication protocol (WCCP) tunnel, etc.).

As described above by reference to FIG. 1, a user in some embodiments specifies the logical network 150 by providing input that describes an LDPS, which is conceptually represented by the logical network 150 and is implemented by a set of managed switching elements. For this example, the OVSs 365-385 and the pool node 350 are used to implement the LDPS. As explained below, to configure the set of managed switching elements, the network control system of some embodiments receives input from the user and converts the user-provided data into LCP data, and then converts the LCP data into LFP data, which the network control system in turn converts into PCP data. The network control system sends the PCP data to the managed switching elements to convert to PFP data in order to implement the LDPS described by the user-provided LCP data.

In some embodiments, the network control system converts the LFP data to universal PCP (UPCP) data. UPCP data in some embodiments is a data plane that enables the control system of some embodiments to scale even when it contains a large number of managed switching elements (e.g., thousands) to implement a LDPS. The UPCP abstracts common characteristics of different managed switching elements in order to express PCP data without considering differences in the managed switching elements and/or location specifics of the managed switching elements.

In some embodiments, network control system translates the UPCP data into customized PCP (CPCP) data for each managed switching element in order to completely implement LDPSs at the managed switching elements. In some such embodiments, the network control system (1) generates CPCP data for each managed switching element by expanding the UPCP data to characteristics specific and/or local to the managed switching element (e.g., ports on the managed switching element) and (2) sends the CPCP data to the managed switching element.

Instead of generating CPCP for each of the managed switching elements, the network control system of some embodiments sends the UPCP data to each of the managed switching elements for the managed switching elements to each generate its own CPCP data, which is used to generate PFP data for the managed switching element. To communicate with and configure the managed switching elements, the network control system of some embodiments uses the OpenFlow or OVS APIs provided by the managed switching elements.

In this example, the middlebox 160 in the logical network 150 illustrated in FIG. 1 is implemented in a distributed manner by middlebox element 305, which is running on host 360, middlebox element 310, which is running on host 365, and middlebox element 315, which is running on host 380. Thus, the middlebox elements 305-315 function collectively as a single middlebox that implements the middlebox 160 in the logical network 150 to performs one or more operations (e.g., transforming, inspecting, filtering, manipulating, etc.) on network data for purposes other than forwarding of the network data. In some embodiments, each of the middlebox elements 305-315 is implemented as a software application or module running on a virtual machine on the corresponding hosts 360-380.

In some embodiments, when a user specifies a middlebox for a logical network, the user also provides input for configuring the middlebox. For example, when the user specifies a wide area network (WAN) optimizer or an intrusion detection system (IDS), the user provides a set of policies that specifies the type of network data to forward to the WAN optimizer or IDS for processing. The user provides different configuration data for different middleboxes in different embodiments.

The network control system described above that is used to configure and provision the OVSs 365-385 to implement the logical network 150 is used to provision the middlebox elements 305-315 in some embodiments. When the user provides the middlebox configuration to the network control system, the network control system identifies a set of nodes (e.g., hosts) over which the middlebox configuration should be implemented, and distributes the configuration to these nodes (e.g., through a set of controllers). For this example, the user provides to the network control system middlebox configuration data for configuring the middlebox 160 in the logical network 150.

To configure the middlebox elements 305-315, the network control system of some embodiments pushes the user-provided middlebox configuration data to each of the middlebox elements 305-315 through a set of APIs provided by the middlebox element. In some embodiments, the network control system also pushes attachment data for the middlebox elements 305-315 with the middlebox configuration data to each of the middlebox elements 305-315 through the set of APIs. In some embodiments, attachment data for each middlebox element 305-315 includes a software port of the managed switching element operating in the same host as the middlebox element.

In some embodiments, the network control system generates slicing data for the middlebox elements 305-315 and pushes this data along with the middlebox configuration data to each of the middlebox elements 305-315 through the set of APIs. The slicing data of some embodiments includes a unique identifier associated with a middlebox in a logical network (e.g., the middlebox 160 in the logical network 150 described above by reference to FIG. 1). In some embodiments, the middlebox elements 305-315 uses the unique identifiers of slicing data to implement (1) different middleboxes for a particular logical network and/or (2) different middleboxes for multiple different logical networks.

As noted above, FIG. 3 illustrates the middlebox 160 in the logical network 150 implemented by the middlebox elements 305-315 running on hosts 360-380. In some embodiments, the middlebox element and the OVS operating on the same host (e.g., the middlebox element 305 and the OVS 365, the middlebox element 310 and the OVS 375, or the middlebox element 315 and the OVS 385) negotiate a software port on the OVS through which to transfer network data. Thus, when the OVS receives network data that is specified to be forwarded to the middlebox element, the OVS forwards the network data through the software port to the managed switching element. Once the middlebox element processes the network data, the middlebox element in some embodiments sends the network data (or a copy of the network data) back to the OVS through the negotiated software port. In some embodiments, the middlebox element does not send the network data back to the OVS.

II. Managed Network Architecture

Figure 4:
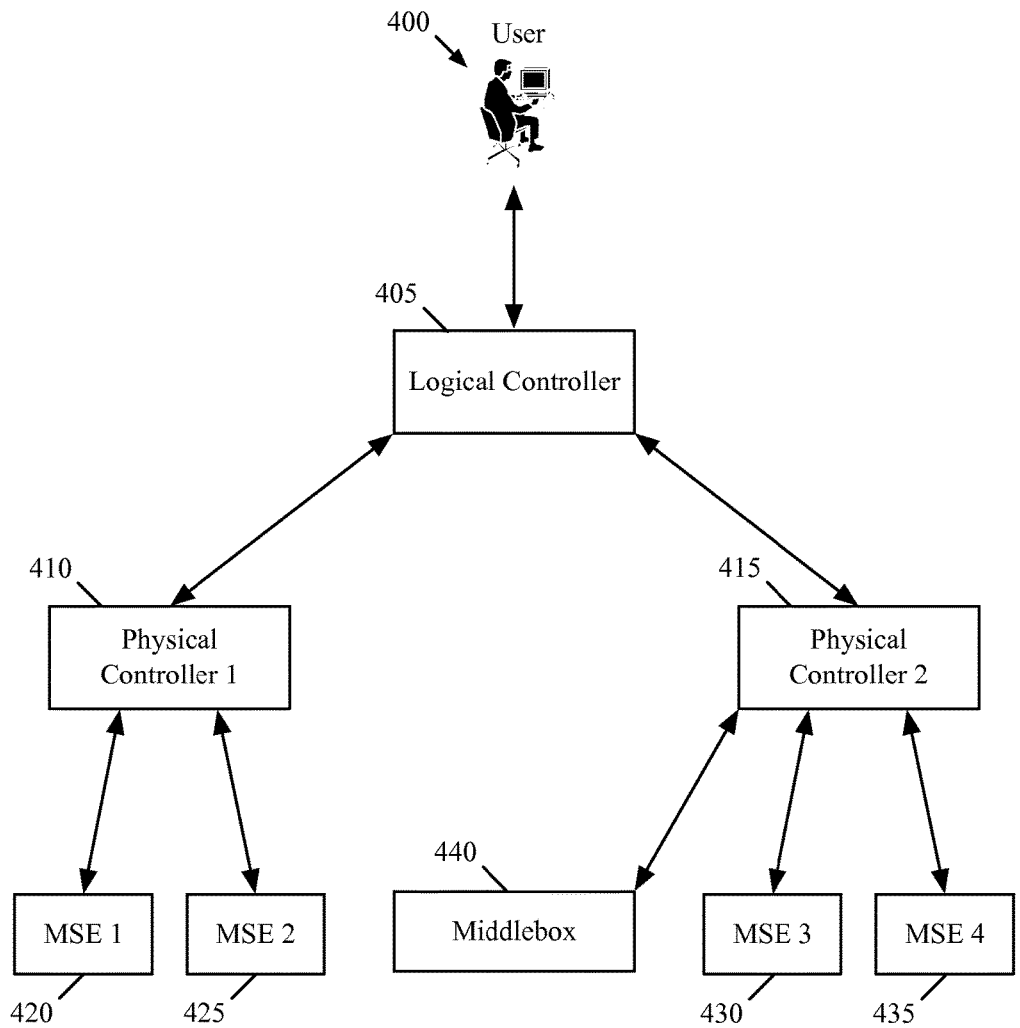
FIG. 4 conceptually illustrates a managed network architecture of some embodiments that is used to implement a logical network.

As described above, the network control system of some embodiments manages a set of switching elements in the physical network infrastructure in order to implement LDPSs (i.e., logical networks). FIG. 4 conceptually illustrates a managed network architecture of some embodiments that is used to implement a logical network (e.g., the logical network 150 described above by reference to FIG. 1). Specifically, FIG. 4 illustrates a user 400, a logical controller 405, physical controllers 410 and 415, managed switching elements 420-435, and a middlebox 440.

In some embodiments, each of the controllers in a network control system has the capability to function as a logical controller and/or physical controller. Alternatively, in some embodiments a given controller may only have the functionality to operate as a particular one of the types of controller (e.g., as a physical controller). In addition, different combinations of controllers may run in the same physical machine. For instance, the logical controller 405 and the physical controller 410 may run in the same computing device, with which a user interacts.

The logical controller 405 in some embodiments is responsible for implementing LDPSs by computing UPCP data (e.g., universal flow entries that are generic expressions of flow entries) for the physical controllers 410 and 415 and the managed switching elements 420-435 to implement the LDPSs. For a particular LDPS, only one logical controller is responsible for implementing the particular LDPS (e.g., is a master of the particular LDPS) in some such embodiments. However, more than one logical controller can be masters of the same LDPS in some embodiments. In addition, a logical controller of some embodiments can be the master of more than one LDPS.

As noted above, in some embodiments, a user specifies a logical network by providing input that describes an LDPS. The input might be related to creating a logical network, modifying the logical network, and/or deleting the logical network in some embodiments. In this example, the logical controller 405 allows the user 400 to specify a logical network through the logical controller 405. When the user 400 specifies a middlebox for the logical network, the user may also provide policy-based routing data that specifies the type of network data to be optimized by the middlebox.

In some embodiments, the logical controller 405 includes an input module (not shown in FIG. 4), such as an input translation application, for translating the input provided by the user 400 into LCP data while, in other embodiments, the input module runs on a separate controller and the logical controller 405 receives the LCP data from the input module on the separate controller. The logical controller 405 of some embodiments provides the user input to the input module in the form of API calls. In some embodiments, the logical controller 405 also includes a control module (e.g., a control application) that generates LFP data from the LCP data output by the input module. The logical controller 405 of some embodiments further includes a virtualization module (e.g., a virtualization application) that generates UPCP from the LFP data output by the control module and sends the UPCP data to the physical controllers 410 and 415.

In some embodiments, a logical controller identifies a set of physical controllers that are masters of the managed switching elements that implement LDPSs. In this example, the managed switching elements 420-435 are responsible for implementing LDPSs and, thus, the logical controller 405 identifies the physical controllers 410 and 415 and sends each of the physical controllers 410 and 415 the generated UPCP data.

In some embodiments, only one physical controller manages a particular managed switching element. For this example, only the physical controller 410 manages the managed switching elements 420 and 425 and only the physical controller 415 manages the managed switching elements 430 and 435. The physical controllers 410 and 415 of some embodiments generate CPCP data (e.g., customized flow entries from universal flow entries) and push these CPCP data down to the managed switching elements 420-435 and the middlebox 440. In some embodiments, the physical controllers 410 and 415 push the UPCP data to the managed switching elements 420-435 and the managed switching elements 420-435 each generates CPCP data for its own respective managed switching element. In some embodiments, the physical controllers 410 and 415 access the managed switching elements 420-435 by using the OpenFlow or OVS APIs provided by the switching elements.

For a centralized middlebox, only one physical controller is responsible for managing the centralized middlebox in some embodiments. As shown in FIG. 4, the physical controller 415 manages the middlebox 440, which is a centralized middlebox in this example. To configure the middlebox 440, the physical controller 415 of some embodiments pushes user-provided middlebox configuration data to the middlebox 440 through a set of APIs provided by the middlebox 440. In some embodiments, the physical controller 415 also pushes attachment data to the middlebox 440 through the set of APIs. The attachment data in some embodiments includes a tunnel type (e.g., a GRE tunnel, a CAPWAP tunnel, a WCCP tunnel, etc.) for the middlebox 440 to use for sending to and receiving from network data to each of the managed switching elements 420-435. In some embodiments, the tunnel type is specified by the user as part of the middlebox configuration data while, in other embodiments, the physical controller 415 automatically determines the tunnel type.

In some embodiments, the physical controller 415 generates slicing data for the middlebox 440 and pushes this data along with the middlebox configuration data to the middlebox 440 through the set of APIs. As mentioned above, the slicing data of some embodiments includes a unique identifier associated with a middlebox in a logical network (e.g., the middlebox 160 in the logical network 150 described above by reference to FIG. 1).

As explained above, the managed switching elements of some embodiments handle the implementation of LDPSs. In some embodiments, the managed switching elements 420-435 implement LDPSs by generating PFP data based on the CPCF that the managed switching elements 420-435 receives from the physical controllers 410 and 415. Instead of receiving CPCP data, the managed switching elements 420-435 of some embodiments receives UPCP data from the physical controllers 410 and 415. In some such embodiments, each of the managed switching elements 420-435 generates CPCP data from the UPCP data and then generates the PFP data from the generated CPCP data.

In some embodiments, the middlebox 440 receives configuration data from the physical controller 415 and, in response, translates the configuration data info a form that is usable by the middlebox 440. For instance, in some embodiments, the middlebox configuration data is in a particular language that expresses the packet processing, analysis, modification, etc. rules. The middlebox 440 of some such embodiments compiles these rules into more optimized packet classification rules. In some embodiments, this transformation is similar to the PCP data to PFP data translation. When the middlebox 440 receives a packet, the middlebox 440 applies the compiled optimized rules in order to efficiently and quickly perform its operations on the packet. In some embodiments, the middlebox 440 is a physical device, a set of physical devices (e.g., a cluster of physical devices), a software application or module running on a computing device or a virtual machine, etc.

The middlebox 440 of some embodiments is used for implementing multiple middleboxes responsible (e.g., different middleboxes for the same logical network, different middleboxes for different logical networks, etc.). In some such embodiments, for each middlebox that the middlebox 440 is responsible for implementing, the middlebox 440 creates and manages a middlebox instance for operating on the middlebox 440. When the middlebox 440 receives through an API a request from the physical controller 415 to create a middlebox instance 445, the middlebox 440 instantiates a middlebox instance 445 and configures it using the middlebox data received from the physical controller 415.

The middlebox 440 of some embodiments provides state information and/or statistical information to the user of the network control system. When the middlebox 440 receives requests for such information from the physical controller 415 (or the logical controller 405 in some embodiments) through API calls, the middlebox 440 sends to the physical controller 415 (or the logical controller 405 in some embodiments) the requested state information and/or statistical information regarding the middlebox 440.

In some embodiments, the logical controller 405, the physical controllers 410 and 415, and the managed switching elements 420-435 use a table mapping engine referred to as n Log that is based on a variation of the datalog database language in order to generate the different types of data (e.g., LCP data, LFP data, UPCP data, CPCP data, PFP data, WAN configuration data, etc.). For instance, the logical controller 405 inputs LCP data to an input table of the table mapping engine of some embodiments and the table mapping engine automatically generates LFP data, which the table mapping engine stores in one of its output tables. Details of the table mapping engine of some embodiments are described below by reference to FIG. 6.

In addition to processing input provided by the user 400, the managed network architecture illustrated in FIG. 4 processes non-user changes to LDPSs. The logical controller 405 computes UPCP data based on the changes and propagates the UPCP to the physical controllers 410 and 415 to in turn propagate to the managed switching elements 420-435 and the middlebox 440.

III. Configuration of Middleboxes and Switching Elements

Figure 5:
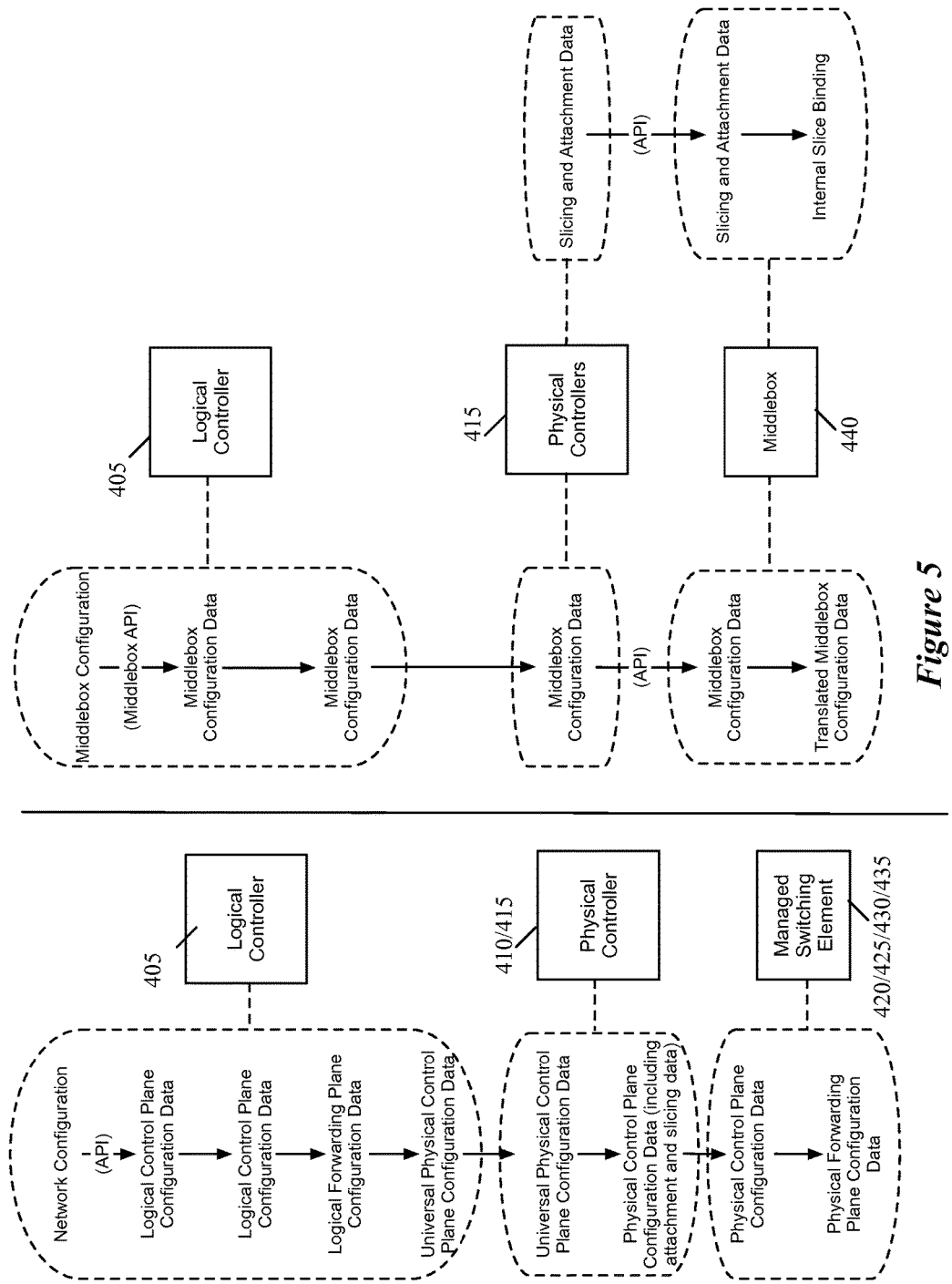
FIG. 5 conceptually illustrates an example flow of configuration data for the managed network architecture illustrated in FIG. 4 according to some embodiments of the invention.

The previous Section II describes an example of a managed network architecture of some embodiments that is used to implement LDPSs. FIG. 5 conceptually illustrates an example flow of configuration data for the managed network architecture illustrated in FIG. 4 according to some embodiments of the invention. In particular, the left side of FIG. 5 illustrates the flow of configuration data for a LPDS and the right side of FIG. 5 illustrates the flow of configuration data for the middlebox 440.

As shown on the left side of FIG. 5, the logical controller 405 receives network configuration data (from a user) through a set of APIs provided by the logical controller 405. The network configuration data in this example describes an LDPS (i.e., a logical network, such at the logical network 150). As noted above, in some embodiments, the logical controller 405 includes an input module (not shown in FIG. 5), such as an input translation application, for generating LCP data from the network configuration data while, in other embodiments, the input module runs on a separate controller and the logical controller 405 receives the LCP data from the input module on the separate controller. The logical controller 405 of some embodiments provides the network configuration data to the input module through a set of API calls.

As illustrated, the logical controller 405 generates the UPCP data from the LCP data by converting the LCP data to LFP data and then converting the LFP data to UPCP. In some embodiments, the logical controller 405 includes a control module (not shown in FIG. 5) that is responsible for generating the LFP data from the LCP data and a virtualization module (not shown in FIG. 5) that handles the generation of the UPCP data from the LFP data. Once the logical controller 405 generates the UPCP, the logical controller 405 sends the generated UPCP data to the physical controllers 410 and 415.

As illustrated on the left side of FIG. 5, the physical controllers 410 and 415 generate, from the received UPCP data, CPCP data for each of the managed switching elements 420-435 and sends the CPCP data to each of the managed switching elements 420-435. In some embodiments, the physical controllers 410 and 415 communicate with and configure the managed switching elements 420-435 through the OpenFlow or OVS APIs provided by the managed switching elements 420-435.

The physical controllers 410 and 415 of some embodiments also sends attachment data and slicing data along with the CPCP data to the managed switching elements 420-435. In some embodiments, the attachment data of some embodiments includes a tunnel type (e.g., a GRE tunnel, a CAPWAP tunnel, a WCCP tunnel, etc.) for the middlebox 440 to use for sending and receiving network data to each of the managed switching elements 420-435. In some embodiments, the tunnel type is specified by the user as part of the middlebox configuration data while, in other embodiments, the physical controller 415 automatically determines the tunnel type.

In some embodiments, the physical controller 415 generates the slicing data for the middlebox 440 and pushes this data along with the middlebox configuration data to the middlebox 440 through the set of APIs. The slicing data of some embodiments includes a unique identifier associated with a middlebox in a logical network (e.g., the middlebox 160 in the logical network 150 described above by reference to FIG. 1). In some embodiments, the middlebox 440 uses the unique identifiers of slicing data to implement (1) different middleboxes for a particular logical network and/or (2) different middleboxes for multiple different logical networks. For instance, in some embodiments, each of the managed switching elements 420-435 adds slicing information to a packet. The slicing information is a tag that indicates a middlebox instance in the middlebox 440 for the middlebox 440 to use to process the packet.

For each of the managed switching elements 420-435, when the managed switching element receives the CPCP data, the managed switching element generates PFP data for implementing the LDPS. Instead of sending CPCP data, in some embodiments, the physical controllers 410 and 415 send the UPCP data to the managed switching elements 420-435. The managed switching elements 420-435 of some such embodiments each generates its own CPCP data from the UPCP data and then generates the PFP data from the generated CPCP data.

The right side of FIG. 5 shows that the network configuration data provided through a set of APIs to the logical controller 405 also includes middlebox configuration data. As shown, the logical controller 405 receives the middlebox configuration data and sends it to the physical controllers 410 and 415. Then, the physical controllers 410 and 415 forward the middlebox configuration data along with the attachment data and slicing data that the physical controllers 410 and 415 generated to the middlebox 440 through a set of API calls.

Once the middlebox 440 receives the middlebox configuration data, the middlebox 440 translates the middlebox configuration data. For instance, in some embodiments, the middlebox configuration data will be received in a particular language to express the packet processing, analysis, modification, etc. rules. The middlebox 440 of some such embodiments translates the middlebox configuration data by compiling these rules into more optimized packet classification rules. In some embodiments, this transformation is similar to the physical control plane to physical forwarding plane data translation. When a packet is received by the middlebox, the middlebox 440 applies the compiled optimized rules in order to efficiently and quickly perform its operations on the packet.

The slicing data generated by the physical controller 415, in some embodiments, includes of a unique identifier associated with a middlebox in a logical network. In some embodiments, the middlebox 440 implements multiple middleboxes. When the middlebox receives a packet from one of the managed switching elements 420-435, in some embodiments the packet includes a prepended tag (e.g., similar to a virtual local area network (VLAN) tag) that identifies a middlebox instance in the middlebox 440 for the middlebox 440 to use for processing the packet.

As shown in FIG. 5, the middlebox 440 translates this slicing information into an internal slice binding. In some embodiments, the middlebox uses its own internal identifiers (different from the tags prepended to the packets) in order to identify states (e.g., active TCP connections, statistics about various IP addresses, etc.) within the middlebox. Upon receiving (1) a request to create a middlebox instance and (2) an external identifier (the unique identifier used on the packets) for the middlebox instance, the middlebox 440 of some embodiments automatically creates the middlebox instance and assigns the middlebox instance an internal identifier. In addition, the middlebox stores a binding for the middlebox instance that maps the external slice identifier to the internal slice identifier.

Figure 6:
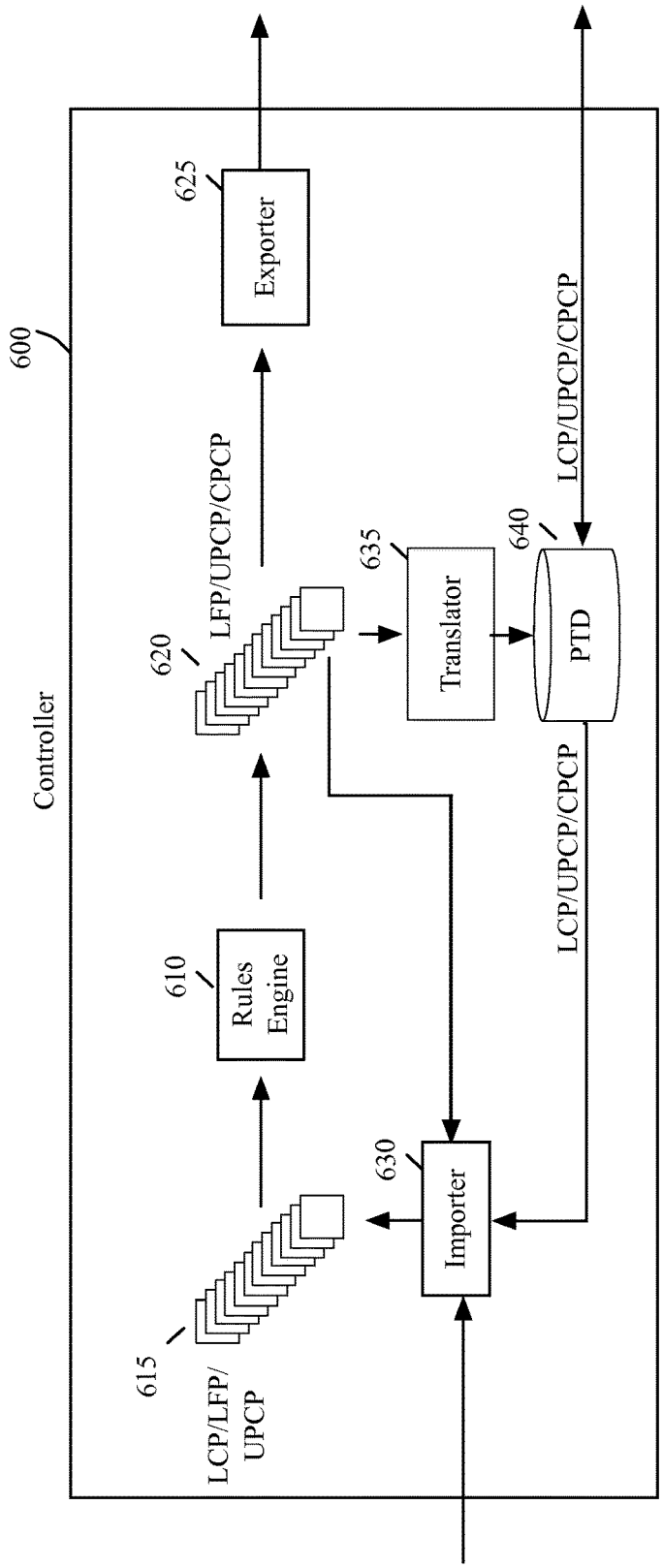
FIG. 6 illustrates example architecture of a network controller of some embodiments FIG. 7 conceptually illustrates a software architecture of a middlebox of some embodiments.

FIG. 6 illustrates example architecture of a network controller (e.g., a logical controller or a physical controller) 600. The network controller of some embodiments uses a table mapping engine to map data from an input set of tables to data in an output set of tables. The input set of tables in a controller include logical control plane (LCP) data to be mapped to logical forwarding plane (LFP) data, LFP data to be mapped to universal physical control plane (UPCP) data, and/or UPCP data to be mapped to customized physical control plane (CPCP) data. The input set of tables may also include middlebox configuration data to be sent to another controller and/or a distributed middlebox instance. The network controller 600, as shown, includes input tables 615, an rules engine 610, output tables 620, an importer 630, an exporter 635, a translator 635, and a persistent data storage (PTD) 640.

In some embodiments, the input tables 615 include tables with different types of data depending on the role of the controller 600 in the network control system. For instance, when the controller 600 functions as a logical controller for a user's logical forwarding elements, the input tables 615 include LCP data and LFP data for the logical forwarding elements. When the controller 600 functions as a physical controller, the input tables 615 include LFP data. The input tables 615 also include middlebox configuration data received from the user or another controller. The middlebox configuration data is associated with a logical datapath set parameter that identifies the logical switching elements to which the middlebox to be is integrated.

In addition to the input tables 615, the control application 600 includes other miscellaneous tables (not shown) that the rules engine 610 uses to gather inputs for its table mapping operations. These miscellaneous tables tables include constant tables that store defined values for constants that the rules engine 610 needs to perform its table mapping operations (e.g., the value 0, a dispatch port number for resubmits, etc.). The miscellaneous tables further include function tables that store functions that the rules engine 610 uses to calculate values to populate the output tables 625.

The rules engine 610 performs table mapping operations that specifies one manner for converting input data to output data. Whenever one of the input tables is modified (referred to as an input table event), the rules engine performs a set of table mapping operations that may result in the modification of one or more data tuples in one or more output tables.

In some embodiments, the rules engine 610 includes an event processor (not shown), several query plans (not shown), and a table processor (not shown). Each query plan is a set of rules that specifies a set of join operations that are to be performed upon the occurrence of an input table event. The event processor of the rules engine 610 detects the occurrence of each such event. In some embodiments, the event processor registers for callbacks with the input tables for notification of changes to the records in the input tables 615, and detects an input table event by receiving a notification from an input table when one of its records has changed.

In response to a detected input table event, the event processor (1) selects an appropriate query plan for the detected table event, and (2) directs the table processor to execute the query plan. To execute the query plan, the table processor, in some embodiments, performs the join operations specified by the query plan to produce one or more records that represent one or more sets of data values from one or more input and miscellaneous tables. The table processor of some embodiments then (1) performs a select operation to select a subset of the data values from the record(s) produced by the join operations, and (2) writes the selected subset of data values in one or more output tables 620.

Some embodiments use a variation of the datalog database language to allow application developers to create the rules engine for the controller, and thereby to specify the manner by which the controller maps logical datapath sets to the controlled physical switching infrastructure. This variation of the datalog database language is referred to herein as n Log. Like datalog, n Log provides a few declaratory rules and operators that allow a developer to specify different operations that are to be performed upon the occurrence of different events. In some embodiments, n Log provides a limited subset of the operators that are provided by datalog in order to increase the operational speed of n Log. For instance, in some embodiments, n Log only allows the AND operator to be used in any of the declaratory rules.

The declaratory rules and operations that are specified through n Log are then compiled into a much larger set of rules by an n Log compiler. In some embodiments, this compiler translates each rule that is meant to address an event into several sets of database join operations. Collectively the larger set of rules forms the table mapping rules engine that is referred to as the n Log engine.

Some embodiments designate the first join operation that is performed by the rules engine for an input event to be based on the logical datapath set parameter. This designation ensures that the rules engine's join operations fail and terminate immediately when the rules engine has started a set of join operations that relate to a logical datapath set (i.e., to a logical network) that is not managed by the controller.

Like the input tables 615, the output tables 620 include tables with different types of data depending on the role of the controller 600. When the controller 600 functions as a logical controller, the output tables 615 include LFP data and UPCP data for the logical switching elements. When the controller 600 functions as a physical controller, the output tables 620 include CPCP data. Like the input tables, the output tables 615 may also include the middlebox configuration data. Furthermore, the output tables 615 may include a slice identifier when the controller 600 functions as a physical controller.

In some embodiments, the output tables 620 can be grouped into several different categories. For instance, in some embodiments, the output tables 620 can be rules engine (RE) input tables and/or RE output tables. An output table is a RE input table when a change in the output table causes the rules engine to detect an input event that requires the execution of a query plan. An output table can also be an RE input table that generates an event that causes the rules engine to perform another query plan. An output table is a RE output table when a change in the output table causes the exporter 625 to export the change to another controller or a MSE. An output table can be an RE input table, a RE output table, or both an RE input table and a RE output table.

The exporter 625 detects changes to the RE output tables of the output tables 620. In some embodiments, the exporter registers for callbacks with the RE output tables for notification of changes to the records of the RE output tables. In such embodiments, the exporter 625 detects an output table event when it receives notification from a RE output table that one of its records has changed.

In response to a detected output table event, the exporter 625 takes each modified data tuple in the modified RE output tables and propagates this modified data tuple to one or more other controllers or to one or more MSEs. When sending the output table records to another controller, the exporter in some embodiments uses a single channel of communication (e.g., a RPC channel) to send the data contained in the records. When sending the RE output table records to MSEs, the exporter in some embodiments uses two channels. One channel is established using a switch control protocol (e.g., OpenFlow) for writing flow entries in the control plane of the MSE. The other channel is established using a database communication protocol (e.g., JSON) to send configuration data (e.g., port configuration, tunnel information).

In some embodiments, the controller 600 does not keep in the output tables 620 the data for logical datapath sets that the controller is not responsible for managing (i.e., for logical networks managed by other logical controllers). However, such data is translated by the translator 635 into a format that can be stored in the PTD 640 and is then stored in the PTD. The PTD 640 propagates this data to PTDs of one or more other controllers so that those other controllers that are responsible for managing the logical datapath sets can process the data.

In some embodiments, the controller also brings the data stored in the output tables 620 to the PTD for resiliency of the data. Therefore, in these embodiments, a PTD of a controller has all the configuration data for all logical datapath sets managed by the network control system. That is, each PTD contains the global view of the configuration of the logical networks of all users.

The importer 630 interfaces with a number of different sources of input data and uses the input data to modify or create the input tables 610. The importer 620 of some embodiments receives the input data from another controller. The importer 620 also interfaces with the PTD 640 so that data received through the PTD from other controller instances can be translated and used as input data to modify or create the input tables 610. Moreover, the importer 620 also detects changes with the RE input tables in the output tables 630.

IV. Middlebox Software Architecture

Figure 7:
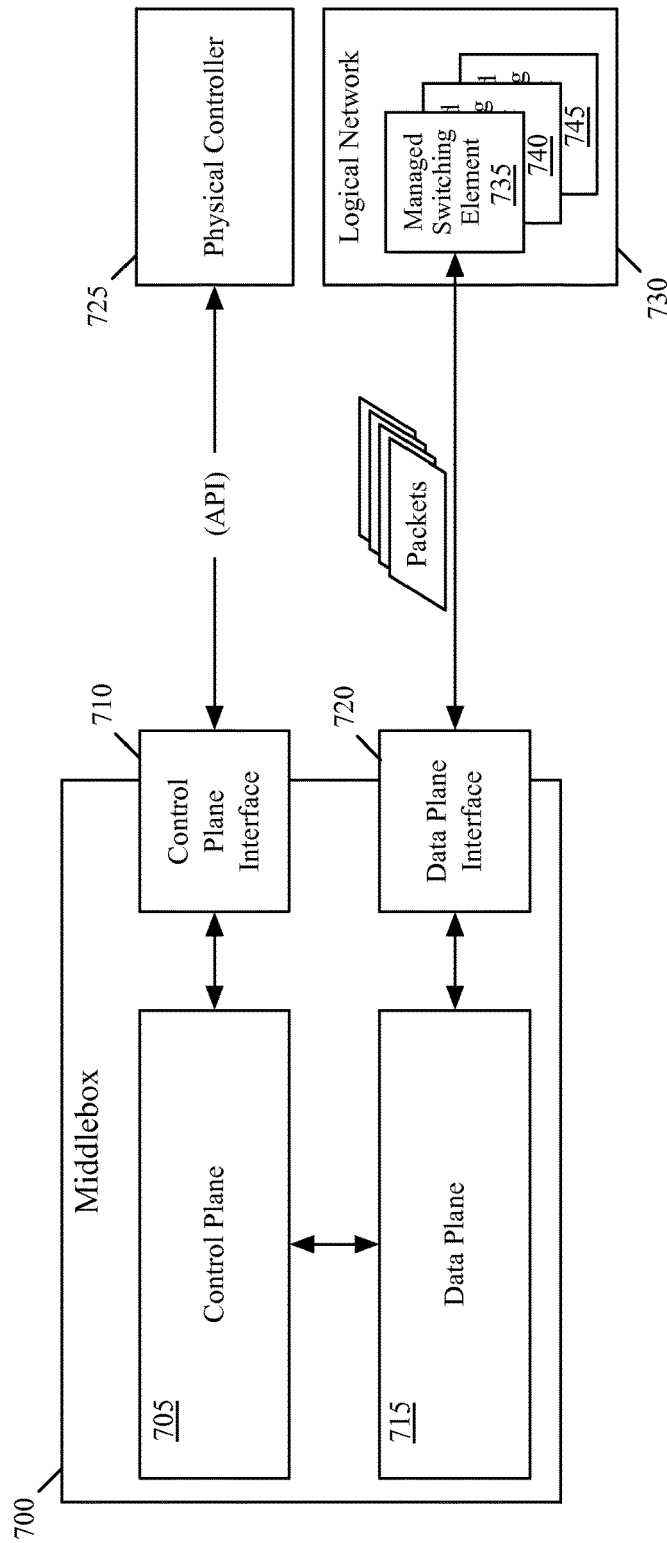

FIG. 7 conceptually illustrates a software architecture of a middlebox 700 of some embodiments. As shown, FIG. 7 illustrates the middlebox 700, a physical controller 725, and a logical network 730 implemented by managed switching elements 735-745. In some embodiments, the middlebox 700 is used to implement each middlebox element of a distributed middlebox (e.g., the middlebox elements 305-315 for the distributed middlebox described above in FIG. 3). The middlebox 700 of some embodiments is used to implement a centralized middlebox (e.g., the middlebox 260 described above by reference to FIG. 2 or the middlebox 440 described above by reference to FIG. 4). In some embodiments, the middlebox 700 is implemented as a physical device, a set of physical devices (e.g., a cluster of physical devices), a virtual machine operating on a computer device, a software application or module running on a computing device or a virtual machine, a process (e.g., a process within a hypervisor), etc.

In some embodiments, the middlebox 700 is used to implement multiple middleboxes (e.g., different middleboxes for the same logical network, different middleboxes for different logical networks, etc.). The middlebox 700 of some embodiments employs a slicing technique to facilitate the implementation of multiple middleboxes on the middlebox 700. In some embodiments, the middlebox 700 creates a middlebox instance that operates on the middlebox 700 for each middlebox that the middlebox 700 implements.

When one of the managed switching elements 735-745 sends packets to the middlebox 700, the managed switching element of some embodiments appends (e.g., prepends) a slice identifier (or tag) on the packet to identify a middlebox instance in the middlebox 700 to process the packet. Thus, when the middlebox 700 receives the packet, the middlebox 700 uses the slice identifier to identify the middlebox instance that corresponds to the slice identifier and processes the packet using the identified middlebox instance.

As shown, the middlebox 700 includes a control plane 705, a control plane interface 710, a data plane 715, and a data plane interface 720. In some embodiments, the control plane interface 710 receives data for creating and configuring a middlebox instance for implementing a middlebox in a logical network. As explained above, a user in some embodiments specifies middlebox configuration data for configuring a middlebox in a logical network. In some embodiments, the user provides this configuration data to a logical controller of network control system that forwards the middlebox configuration data to a physical controller of the network control system, which forwards the configuration data to the middlebox.

In some embodiments, the control plane interface 710 provides a set of APIs for receiving middlebox configuring data from the physical controller 725. The set of APIs of some embodiments are implemented as a web service for receiving middlebox configuration data from the physical controller 725 over a communication protocol (e.g., a hypertext transfer protocol secure (HTTPS) protocol). In some embodiments, the middlebox configuration data is represented using JavaScript Object Notation (JSON), Extensible Markup Language (XML), etc.

As described above, for a centralized middlebox, the middlebox configuration data includes tunnel data for establishing a tunnel to each managed switching element with which the centralized middlebox communicates. In some embodiments, the tunnel data is represented by a data structure that specifies an IP address of the managed switching element with which to establish a tunnel, a tunnel type of the tunnel (e.g., (e.g., a VLAN tunnel, a stateless transport tunneling (STT) tunnel, a GRE tunnel, a CAPWAP tunnel, a WCCP tunnel, etc.)), and an encapsulation label. In some embodiments, the encapsulation label includes an identifier (e.g., slicing data) that identifies a middlebox instance in the middlebox 700. The identified middlebox instance is used for processing packets having slice identifiers that match the encapsulation label's identifier.

In some embodiments, when network data reaches a centralized middlebox, the centralized middlebox performs its configured functions on the network data. The centralized middlebox of different embodiments handles the network data forwarding differently. For instance, the centralized middlebox of some embodiments sends the network data (or a copy of the network data) to a pool node (e.g., the pool node described by below by reference to FIG. 3) to perform the first-hop logical processing on the network data and forward the network data to its destination.

In some embodiments, the centralized middlebox performs the first-hop logical processing on the network data and forwards the network data to its destination. For example, in some embodiments where a logical network includes a logical L2 switch and a logical middlebox, the centralized middlebox of some embodiments performs the logical processing (i.e. L2 logical processing) on the network data. Based on the logical forwarding decision, the centralized middlebox forwards the network data to the appropriate managed switching element for forwarding to its destination.

In some embodiments, the control plane interface 710 is used to collect data related to middlebox slices in the middlebox 700 and to provide the data to a user (e.g., the user that configured the logical network). In some embodiments, data related to middlebox slices includes state information and statistical information related to the middlebox slices in the middlebox 700. Different embodiments store the data differently. Some embodiments use a table, a database, a hash table, etc.

The control plane interface 710 of some embodiments provides APIs that allow both synchronous (also referred to as blocking) operations and asynchronous (also referred to as non-blocking) operations. With the synchronous operations, the middlebox 700 of some embodiments does not complete a packet processing operation before the state update for the state of a middlebox slice is disseminated for other middlebox slices that require access to the state. Thus, if a particular middlebox fails, the other middlebox slices is able to carry over the packet processing without any impact to end-user traffic. For asynchronous operations, the middlebox 700 of some embodiments performs packet processing operations independently from the dissemination of state updates.

The control plane interface 710 of some embodiments provides primitives to manage data related to the middlebox slices (active and inactive middlebox slices). In some embodiments, the control plane interface 710 receives requests to invoke primitives from the physical controller 725 while, in other embodiments, the control plane interface 710 receives requests to invoke the primitives from the logical controller responsible for implementing of the logical network. Yet, in some embodiments, the control plane interface 710 receives requests to invoke primitives from both the physical controller 725 and the logical controller. In some embodiments, the control plane interface 710 sends query results for primitives that query for information to the physical controller 725 while, in other embodiments, the control plane interface 710 sends the query results to the logical controller.

The primitives provided by the control plane interface 710 of some embodiments include a put primitive for adding and/or modifying state information related to a middlebox slice, a remove primitive for removing state information related to a middlebox slice, a get primitive for querying state information related to a middlebox slice, and a configuration primitive for querying configuration information related to a middlebox slice.

In some embodiments, to add and/or modify state information related to a middlebox slice in the middlebox 700, the put primitive requires a slice identifier for identifying the middlebox slice, a key identifier for identifying an attribute of the middlebox slice, a state identifier for specifying a state of the attribute of the middlebox slice, time-to-live data specifying an amount of time for the state of the attribute lives before being removed, and a blocking flag for specifying the mode of operation (e.g., asynchronous mode, synchronous mode, etc.) for performing the put primitive.

To removing state information related to a middlebox slice in the middlebox 700, the remove primitive in some embodiments requires a slice identifier for identifying the middlebox slice, a key identifier for identifying an attribute of the middlebox slice, and a blocking flag for specifying the mode of operation (e.g., asynchronous mode, synchronous mode, etc.) for performing the remove primitive.

Using the get primitive to query state information related to a middlebox slice in the middlebox 700 requires a slice identifier for identifying the middlebox slice, a key identifier for identifying an attribute of the middlebox slice, and a blocking flag for specifying the mode of operation (e.g., asynchronous mode, synchronous mode, etc.) for performing the remove primitive.

As mentioned, the configuration primitive of some embodiments is for querying configuration information related to a middlebox slice in the middlebox 700. In some embodiments, to query configuration information related to the middlebox slice, the configuration primitive requires a slice identifier for identifying the middlebox slice.

The control plane interface 710 of some embodiments provides statistical information related to middlebox slices in the middlebox 700 through APIS. The middlebox 700 of different embodiments provide different types of statistical data. For instance, in some embodiments where the middlebox 700 is implemented as a load balancer, the control plane interface 710 of some embodiments provides information about throughput for public load-balanced virtual IPs and protocols, packets per second numbers for public load-balanced virtual IPs and protocols, connection statistics regarding active load-balanced connections, etc.

As another example, for the middlebox 700 of some embodiments that is implemented as a load balancer, the control plane interface 710 of some embodiments provides information about connection statistics regarding the active connections, summary statistics regarding current passing network traffic, statistics for a firewall rule (e.g., the number of connections denied and/or accepted based on the firewall rule), etc.

In some embodiments, the control plane 705 manages the middlebox instances in the middlebox 700. For example, when the control plane 705 receives middlebox configuration data for a middlebox in a logical network (through the control plane interface 710), the control plane 705 creates a middlebox instance. When creating a middlebox instance, the control plane 705 of some embodiments compiles rules (e.g., packet processing, analysis, modification, etc. rules) for a middlebox specified in a logical network (e.g., the logical network 730 in this example) into more optimized packet classification rules that the data plane 715 uses to process packets. In some embodiments, the control plane 705 assigns the optimized packet classification rules an internal unique identifier and stores a mapping that binds (e.g., associates) the assigned internal unique identifier with the slice identifier associated with the middlebox in the logical network.

As mentioned above, the control plane 705 of some embodiments creates a middlebox instance when the control plane 705 receives middlebox configuration data for a middlebox in a logical network. In some embodiments, the control plane 705 of some embodiments creates a middlebox instance when the control plane 705 receives a slice identifier from the physical controller 725.

Figure 8:
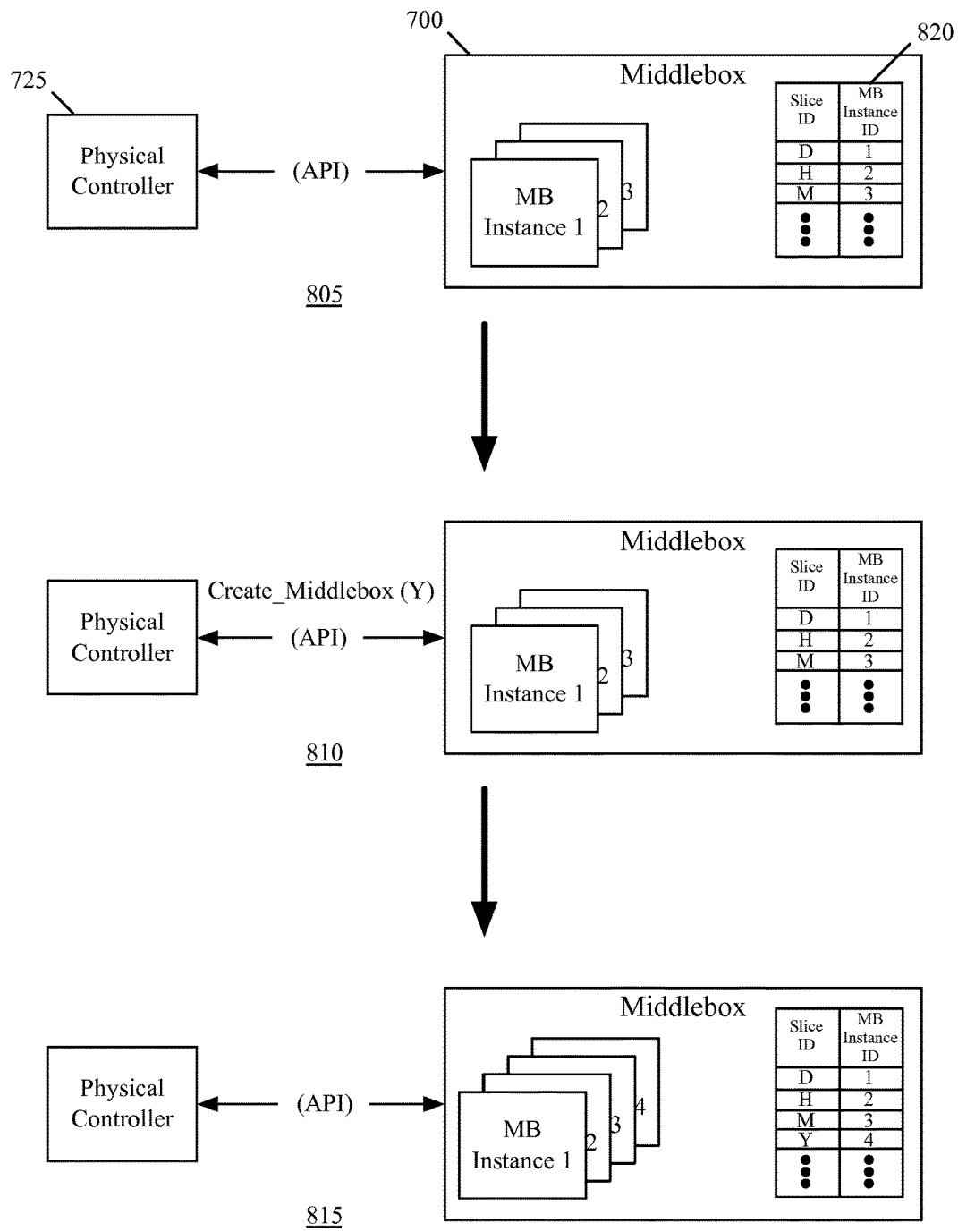
FIG. 8 conceptually illustrates a technique for creating a middlebox instance according to some embodiments of the invention.

FIG. 8 conceptually illustrates a technique for creating a middlebox instance according to some embodiments of the invention. Specifically, FIG. 8 illustrate the middlebox 700 at three different stages 805-815 that show creating a middlebox instance in response to receiving a slice identifier.

The first stage 805 shows that the middlebox 700 has middlebox instances 1, 2, and 3. As illustrated in the first stage 805, the middlebox 700 includes a set of mappings 820 that each associates an internal unique identifier (referred to as a middlebox instance identifier in this example) assigned to a middlebox instance with a slice identifier that identifies a middlebox in a logical network. In this example, the set of mappings 820 includes a mapping that associates a slice identifier "D" with an internal unique identifier "1", a mapping that associates a slice identifier "H" with an internal unique identifier "2", and a mapping that associates a slice identifier "M" with an internal unique identifier "3". Different embodiments store the set of mappings 820 any number of different ways. In some embodiments, the set of mappings 820 are stored in a volatile storage (e.g., random access memory (RAM)), a non-volatile storage, in a database (e.g., a relational database), etc.

The second stage 810 illustrates the middlebox 700 receiving a request to create a middlebox instance. As shown, the physical controller 725 is sending the middlebox 700 a command (using a Create_Middlebox command in this example) for creating a middlebox instance associated with a slice identifier "Y". In some embodiments, the middlebox 700 (e.g., the control plane 710) creates a middlebox instance when the middlebox 700 receives the command from the physical controller 725.

The third stage 815 shows the middlebox 700 after the middlebox 700 creates a middlebox instance in response to the command illustrated in the second stage 810. For this example, when the middlebox 700 creates the middlebox instance, the middlebox 700 (e.g., the control plane 710) assigns the created middlebox instance an internal unique identifier "4". The middlebox 700 (e.g., the control plane 710) then adds a mapping to the set of mappings 820 that associates the slice identifier "Y" with the internal unique identifier "4".

In some embodiments, the middlebox 700 includes a feature for dynamically learning middlebox slices. The middlebox 700 of some such embodiments learns slices by analyzing packets receiving over the data plane interface and detecting when slices appear and disappear. In some embodiments, the middlebox 700 provides the slice learning feature when the middlebox 700 implements a middlebox that requires little to no configuration in order to operate. Examples of such middleboxes include a middlebox for accelerating network data, a middlebox for caching network data, etc.

Figure 9:
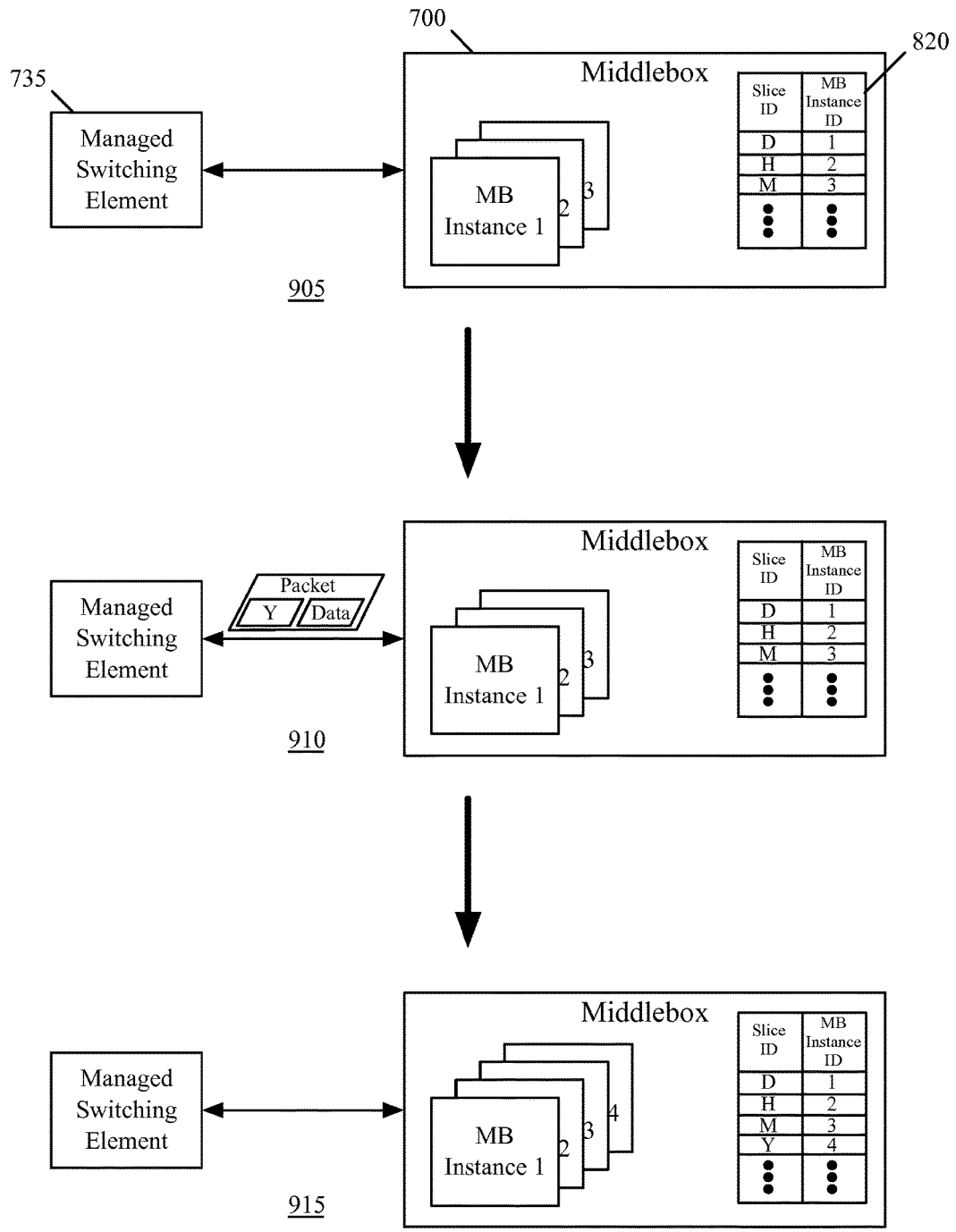
FIG. 9 conceptually illustrates another technique for creating a middlebox instance according to some embodiments of the invention.

FIG. 9 conceptually illustrates another technique for creating a middlebox instance according to some embodiments of the invention. In particular, FIG. 9 illustrate the middlebox 700 at three different stages 905-915 that show dynamically creating a middlebox instance in response receiving a packet with an unknown slice identifier.

The first stage 905 is similar to the first stage 805 described above by reference to FIG. 8 except the first stage 905 shows the managed switching element 735 coupled to the middlebox 700 instead of the physical controller 725. Accordingly, the middlebox 700 at this stage the set of mappings 820 that associates the slice identifier "D" with the internal unique identifier "1", the slice identifier "H" with the internal unique identifier "2", and the slice identifier "M" with the internal unique identifier "3".

Next, the second stage 910 illustrates the middlebox 700 receiving a packet from the managed switching element 735 (through a tunnel in some embodiments). When the middlebox 700 (e.g., the data plane interface 720) receives the packet, the middlebox 700 (e.g., the data plane 715) processes the packet and identifies the slice identifier in the packet. The middlebox 700 examines the set of mappings 820 to determine whether it contains a mapping with the slice identifier in the packet. As shown, the packet in this example has a slice identifier "Y" and the set of mappings 820 does not include a mapping with a slice identifier "Y".

When the middlebox 700 determines that the set of mappings 820 does not contain a mapping with the slice identifier in the packet, the middlebox 700 (e.g., the control plane 710) automatically creates a middlebox instance (e.g., using a default configuration or no configuration at all), assigns the created middlebox instance an internal unique identifier, and adds a mapping to the set of mappings 820 that associates the slice identifier of the packet with the internal unique identifier.

The third stage 915 shows the middlebox 700 after the middlebox 700 dynamically creates a middlebox instance in response to determining that the middlebox 700 does not have a middlebox instance associated with the packet illustrated in the second stage 910. For this example, when the middlebox 700 creates the middlebox instance, the middlebox 700 (e.g., the control plane 710) assigns the created middlebox instance an internal unique identifier "4". The middlebox 700 (e.g., the control plane 710) then adds a mapping to the set of mappings 820 that associates the slice identifier "Y" with the internal unique identifier "4".

In some embodiments, the data plane interface 720 is for receiving packets forwarded from the logical network 730 (e.g., based on policies specified for the logical network 730). The data plane interface 720 of different embodiments receives packets from different managed switching elements 735-745. For instance, in some embodiments where a centralized middlebox implementation is used, the data plane interface 720 receives packets from all of the managed switching elements 735-745. However, for some embodiments in which a distributed middlebox implementation is used, the data plane interface 720 receives packets from only one of the managed switching elements 735-745. For example, when the middlebox 700 of some embodiments is used to implement a middlebox element running on a host illustrated in FIG. 3 (e.g., the middlebox element 305, the middlebox element 310, or the middlebox element 315), the data plane interface 720 of such middlebox 700 receives packets from the OVS operating on the same host as the middlebox 700.

The data plane interface 720 of some embodiments is also for sending processed packets back to the logical network 730. In some such embodiments, the middlebox 700 processes the packets received from the logical network 730 and sends the processed packets back to the logical network 730. In other such embodiments, the middlebox 700 sends a copy of the processed packets (as new packets) back to the logical network 730.

In some embodiments, the data plane 715 of the middlebox 700 is for processing the packets received from the logical network 730 (through the data plane interface 720). When the data plane 715 receives a packet, the data plane 715 accesses middlebox 700's mappings to identify the mapping that associates the internal unique identifier associated with the slice identifier specified in the network data. The data plane 715 then applies to the network data the compiled optimized rules to which the internal unique identifier in the identified mapping is assigned, in order to efficiently and quickly process the network data.

In some embodiments, the middlebox 700 is implemented on a machine (e.g., a computing device or a virtual machine) that includes a kernel and a user space (e.g., a kernel and a user space of an operating system, such as Linux, running on the machine.). Different embodiments implement the middlebox 700 on the machine differently. For instance, in some embodiments, the data plane 715 and the data plane interface 720 operate in the kernel of the machine while the control plane 705 and the control plane interface 710 operate in the user space of the machine.

The middlebox 700 of some embodiments is implemented with the data plane 715, the data plane interface 715, the control plane 705, and the control plane interface 710 all operating in the user space of the kernel. In some such embodiments, the kernel exposes a set of network interfaces that is substantially or completely controllable by the user space (e.g., using a role in the user space that gives sufficient privileges to control the set of network interfaces).

V. Electronic Systems

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
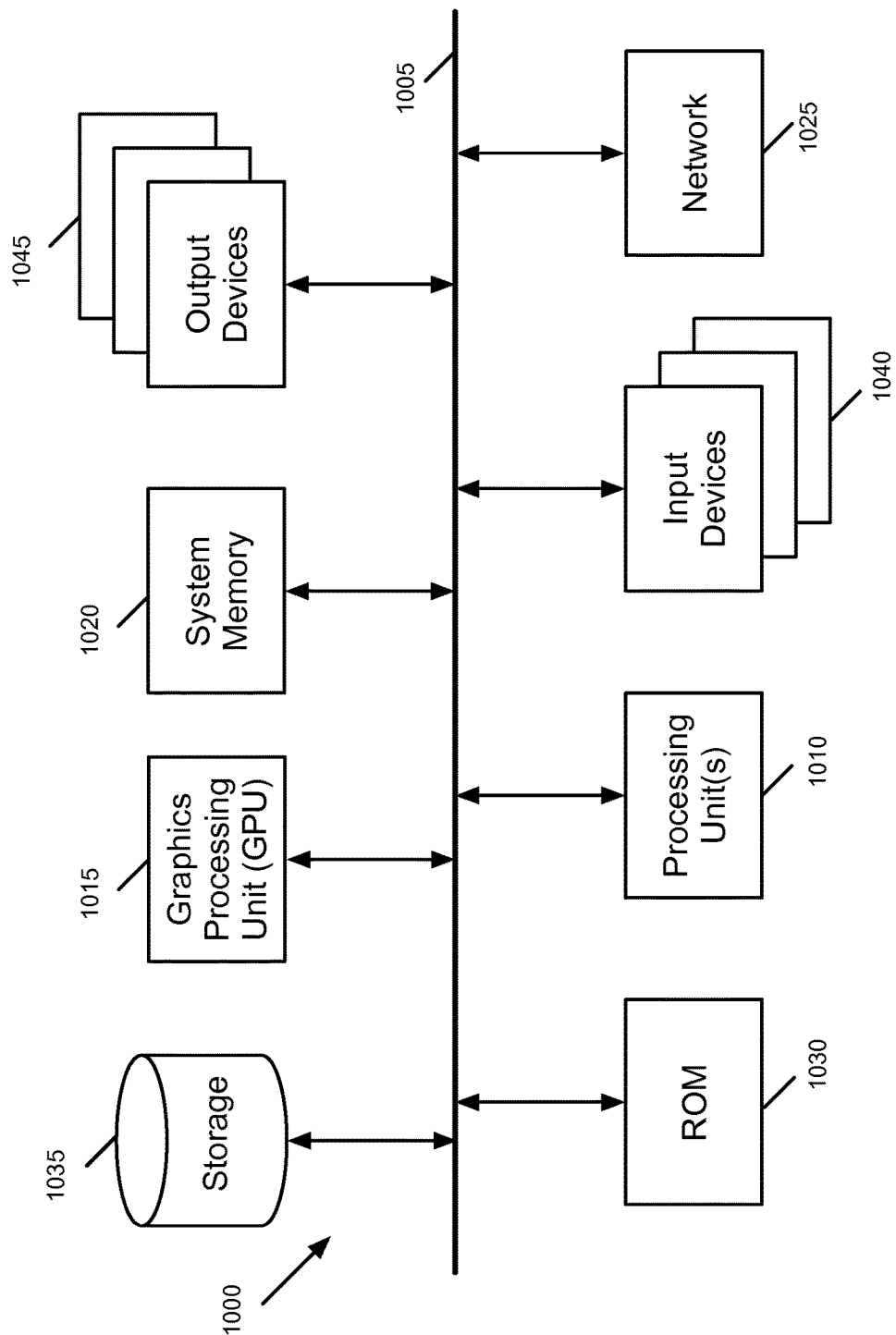
FIG. 10 conceptually illustrates an electronic device with which some embodiments of the invention are implemented.

FIG. 10 conceptually illustrates an electronic system 1000 with which some embodiments of the invention are implemented. The electronic system 1000 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1000 includes a bus 1005, processing unit(s) 1010, a graphics processing unit (GPU) 1015, a system memory 1020, a network 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the GPU 1015, the system memory 1020, and the permanent storage device 1035.

From these various memory units, the processing unit(s) 1010 retrieves instructions to execute and data to process in order to execute the processes of the invention. The processing unit(s) may be a single processor or a multi-core processor in different embodiments. Some instructions are passed to and executed by the GPU 1015. The GPU 1015 can offload various computations or complement the image processing provided by the processing unit(s) 1010.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash memory device, etc., and its corresponding drive) as the permanent storage device. Like the permanent storage device 1035, the system memory 1020 is a read-and-write memory device. However, unlike storage device 1035, the system memory 1020 is a volatile read-and-write memory, such a random access memory. The system memory 1020 stores some of the instructions and data that the processor needs at runtime. In some embodiments, the invention's processes are stored in the system memory 1020, the permanent storage device 1035, and/or the read-only memory 1030. From these various memory units, the processing unit(s) 1010 retrieves instructions to execute and data to process in order to execute the processes of some embodiments.

The bus 1005 also connects to the input and output devices 1040 and 1045. The input devices 1040 enable the user to communicate information and select commands to the electronic system. The input devices 1040 include alphanumeric keyboards and pointing devices (also called "cursor control devices"), cameras (e.g., webcams), microphones or similar devices for receiving voice commands, etc. The output devices 1045 display images generated by the electronic system or otherwise output data. The output devices 1045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 10, bus 1005 also couples electronic system 1000 to a network 1025 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory machine readable medium of a host machine of a hosting system on which a middlebox executes, the middlebox comprising sets of instructions for:
receiving configuration data for configuring the middlebox to instantiate a middlebox instance that implements, along with a set of other middleboxes executing on a set of other host machines, a logical middlebox in a logical network that logically connects a plurality of end machines residing on the set of host machines, each middlebox executing on one of the host machines on which one or more end machines of the plurality of end machines execute;
receiving a particular identifier associated with the logical middlebox implementation on the host machine;
generating (1) based on the received configuration data, a set of rules for the middlebox to process packets for the logical network and (2) based on the received particular identifier, an internal identifier associated with the generated set of rules; and
associating the particular identifier with the internal identifier for processing packets that have the particular identifier based on the generated set of rules.

2. The non-transitory machine readable medium of claim 1, wherein a subset of the plurality of end machines that reside on the host machine receives middlebox services from the middlebox executing on the host machine.

3. A non-transitory machine readable medium of a host machine of a hosting system on which a middlebox executes, the middlebox comprising sets of instructions for:
receiving configuration data for configuring the middlebox to implement, along with a set of other middleboxes executing on a set of other host machines, a logical middlebox in a logical network that logically connects a plurality of end machines residing on the set of host machines, each middlebox executing on one of the host machines on which one or more end machines of the plurality of end machines execute,
wherein a subset of the plurality of end machines that reside on the host machine receives middlebox services from the middlebox executing on the host machine,
wherein the subset of end machines is logically connected to the logical network through a set of logical forwarding elements implemented by a managed forwarding element that executes on the host machine, wherein the managed forwarding element and the middlebox exchange the packets that have the particular identifier through a software port negotiated between the managed forwarding element and the middlebox;
receiving a particular identifier associated with the logical middlebox implementation on the host machine;
generating (1) based on the received configuration data, a set of rules for the middlebox to process packets for the logical network and (2) based on the received particular identifier, an internal identifier associated with the generated set of rules; and
associating the particular identifier with the internal identifier for processing packets that have the particular identifier based on the generated set of rules.

4. The non-transitory machine readable medium of claim 1, wherein the middlebox further comprises sets of instructions for:
providing a control plane interface for receiving the configuration data; and
providing a data plane interface for receiving the packets that have the particular identifier.

5. The non-transitory machine readable medium of claim 4, wherein the middlebox further comprises sets of instructions for:
providing a control plane for generating (1) the set of rules to process packets for the logical network and (2) the internal identifier associated with the set of rules; and
providing a data plane for processing the packets received through the data plane interface.

6. The non-transitory machine readable medium of claim 4, wherein the control plane interface is further for receiving a request for data related to the logical middlebox implementation and providing the requested data.

7. The non-transitory machine readable medium of claim 4, wherein the control plane interface provides a set of Application Programming Interfaces (APIs) for receiving the configuration data from a physical controller.

8. The non-transitory machine readable medium of claim 7, wherein the set of APIs are implemented as a web service for receiving the configuration data from the physical controller over a communication protocol.

9. The non-transitory machine readable medium of claim 1, wherein the logical middlebox is implemented by a first middlebox instance instantiated by the middlebox, the logical middlebox is a first logical middlebox, the particular identifier is a first identifier, and the configuration data is first configuration data, wherein the middlebox further comprises sets of instructions for:
  receiving second configuration data for configuring the middlebox to instantiate a second middlebox instance to implement a second logical middlebox for the logical network;
  receiving a second identifier associated with the second middlebox instance implemented on the host machine;
  generating (1) based on the received configuration data, a different set of rules for the second middlebox instance to process packets for the logical network, and (2) based on the received second identifier, another internal identifier associated with the different set of rules for the second middlebox instance; and
  associating the second identifier with the other internal identifier for processing packets that have the second identifier based on the different set of rules.

10. The non-transitory machine readable medium of claim 9, wherein the first logical middlebox implemented by the first middlebox instance instantiated by the middlebox comprises a logical firewall and the second logical middlebox implemented by the second middlebox instance instantiated by the middlebox comprises a logical wide area network (WAN) optimizer.

11. A method for implementing a middlebox that executes on a host machine in a system comprising a plurality of host machines, the method comprising:
  through a first interface, receiving configuration data to configure the middlebox to instantiate a middlebox instance that implements a logical middlebox in a logical network along with a set of other middleboxes that executes on a set of other host machines, the logical network logically connecting a plurality of end machines, each middlebox executing on one of the host machines on which one or more end machines of the plurality of end machines execute;
  instantiating the middlebox instance based on the received configuration data; and
  through a second interface, receiving packets that are destined for the logical middlebox implemented by the middlebox, the first interface further receiving a request for data related to the logical middlebox implementation and providing the requested data.

12. The method of claim 11, wherein the logical middlebox comprises a logical load balancer, wherein the data related to the middlebox instance comprise connection statistics of active load-balanced connections.

13. The method of claim 11, wherein the data related to the logical middlebox implementation comprise data related to packets per second for a set of virtual Internet Protocol (IP) addresses and protocol pairs.

14. The method of claim 11, wherein the logical middlebox comprises a logical firewall, wherein the data related to the middlebox instance comprise connection statistics of active connections.

15. The method of claim 14, wherein the data related to the middlebox instance further comprise summary statistics of current network data passing through the logical firewall.

16. The method of claim 11, wherein the first interface is a control plane interface that provides a set of Application Programming Interfaces (APIs) for receiving the configuring data from a physical controller, wherein the set of APIs are implemented as a web service for receiving the configuration data from the physical controller over a communication protocol.

17. The non-transitory machine readable medium of claim 1, wherein the logical middlebox is one of a logical firewall, a logical wide area network (WAN) optimizer, and a logical intrusion detection system.

18. The non-transitory machine readable medium of claim 1, wherein when the middlebox receives a packet that carries the particular identifier, the middlebox uses the particular identifier to identify the middlebox instance that corresponds to the particular identifier and processes the packet using the identified middlebox instance.

19. The non-transitory machine readable medium of claim 1, wherein each end machine is a virtual machine that operates on a host machine of the hosting system.

20. The non-transitory machine readable medium of claim 1, wherein the middlebox further comprises a set of instructions for instantiating a plurality of middlebox instances that implement a plurality of logical middleboxes for a plurality of logical networks each of which implemented on a subset of the plurality of host machines of the hosting system.

21. The non-transitory machine readable medium of claim 3, wherein the middlebox further comprises sets of instructions for:
  providing a control plane interface for receiving the configuration data; and
  providing a data plane interface for receiving the packets that have the particular identifier.

22. The non-transitory machine readable medium of claim 21, wherein the middlebox further comprises sets of instructions for:
  providing a control plane for generating (1) the set of rules to process packets for the logical network and (2) the internal identifier associated with the set of rules; and
  providing a data plane for processing the packets received through the data plane interface.

* * * * *